US012073773B2

(12) United States Patent
Kwon et al.

(10) Patent No.: US 12,073,773 B2
(45) Date of Patent: Aug. 27, 2024

(54) SMALL SIZE PIXEL AND DISPLAY DEVICE INCLUDING THE SAME

(71) Applicant: Samsung Electronics Co., Ltd., Suwon-si (KR)

(72) Inventors: Taehyeon Kwon, Seoul (KR); Yongil Kwon, Suwon-si (KR); Sugyeung Kang, Suwon-si (KR); Kangjoo Kim, Hwaseong-si (KR); Sunkwon Kim, Hwaseong-si (KR); Hyunsang Park, Seongnam-si (KR); Yilho Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 40 days.

(21) Appl. No.: 17/520,890

(22) Filed: Nov. 8, 2021

(65) Prior Publication Data

US 2022/0335882 A1 Oct. 20, 2022

(30) Foreign Application Priority Data

Apr. 19, 2021 (KR) ........................ 10-2021-0050742

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0286* (2013.01); *G09G 2310/0289* (2013.01); *G09G 2310/0297* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 10,388,205 | B2 | 8/2019 | Cok et al. |
| 10,679,560 | B2 | 6/2020 | Huang et al. |
| 10,720,098 | B2 | 7/2020 | Valentine |
| 10,950,178 | B2 | 3/2021 | Wacyk |

(Continued)

FOREIGN PATENT DOCUMENTS

| | | | |
|---|---|---|---|
| KR | 101942466 | A | 7/2018 |
| KR | 10-2020-0029706 | A | 3/2020 |

(Continued)

*Primary Examiner* — Andre L Matthews
(74) *Attorney, Agent, or Firm* — Harness, Dickey & Pierce, P.L.C.

(57) ABSTRACT

A device includes a pixel array, a row driver configured to, generate a plurality of control signals, drive a plurality of rows of the pixel array using the plurality of control signals, and generate a plurality of clock signals, a row multiplexer configured to receive the plurality of clock signals, and transmit one clock signal of the plurality of clock signals, a data driver configured to transmit a plurality of data signals to the pixel array by column units, each pixel of the plurality of pixels includes, a light emitting device, a shift register configured to receive the selectively transmitted clock signal from the row multiplexer, and generate a width adjusted pulse width modulation (PWM) signal based on a desired brightness level of the light emitting device, and a transistor configured to transmit a driving current to the light emitting device based on the PWM signal.

20 Claims, 14 Drawing Sheets

(56) References Cited

U.S. PATENT DOCUMENTS

| | | | | |
|---|---|---|---|---|
| 10,997,899 | B1 * | 5/2021 | Bae | G09G 3/2092 |
| 2002/0000982 | A1 * | 1/2002 | Takagi | G09G 5/18 345/204 |
| 2002/0024511 | A1 * | 2/2002 | Ozawa | G09G 3/2011 345/204 |
| 2009/0002351 | A1 * | 1/2009 | Kim | G09G 3/3648 345/204 |
| 2014/0368561 | A1 | 12/2014 | Liao et al. | |
| 2016/0267868 | A1 * | 9/2016 | Choi | G09G 3/3266 |
| 2018/0247586 | A1 * | 8/2018 | Vahid Far | G09G 3/3216 |
| 2020/0135092 | A1 | 4/2020 | Ahmed | |
| 2020/0302841 | A1 * | 9/2020 | Jung | G09G 3/3275 |
| 2021/0118358 | A1 * | 4/2021 | Lee | G09G 3/2022 |
| 2021/0174734 | A1 | 6/2021 | Takahashi et al. | |
| 2021/0366345 | A1 * | 11/2021 | Tseng | G09G 3/2007 |

FOREIGN PATENT DOCUMENTS

| | | | |
|---|---|---|---|
| KR | 10-2020-0096245 | A | 8/2020 |
| KR | 10-2020-0123204 | A | 10/2020 |

* cited by examiner

SMALL SIZE PIXEL AND DISPLAY DEVICE INCLUDING THE SAME

CROSS-REFERENCE TO RELATED APPLICATION

This U.S. non-provisional application is based on and claims the benefit of priority under 35 U.S.C. § 119 to Korean Patent Application No. 10-2021-0050742, filed on Apr. 19, 2021, in the Korean Intellectual Property Office, the disclosure of which is incorporated by reference herein in its entirety.

BACKGROUND

Various example embodiments of the inventive concepts relate to a pixel, and more particularly, to a pixel with a small size, a display device including the pixel with a small size, and/or a method of operating a display device including a pixel with small size, etc.

As information society has developed, demand for display devices for displaying images has increased and various types of display devices, such as liquid crystal display (LCD) devices, plasma display devices, and organic light emitting display devices have been used. In particular, interest in display devices using a micro light emitting diode (μLED) (hereinafter, referred to as a "micro display devices") has increased recently.

As improved display device characteristics are desired and/or required to implement virtual reality (VR), augmented reality (AR), and/or mixed reality (MR) technologies, etc., micro light emitting diodes (LEDs) on silicon or active matrix organic light emitting diodes (AMOLED) on silicon has been increasingly developed. In particular, in order to realize an image having high resolution for these applications, a reduction in pixel size is in demand.

SUMMARY

Various example embodiments of the inventive concepts relate to a pixel, a display device including the pixel, and/or a method of operating the display device, etc., and more specifically, at least one example embodiment provides a small size pixel by simplifying a structure of an associated pixel circuit.

According to an aspect of at least one example embodiment of the inventive concepts, there is provided a device including a pixel array including a plurality of rows, and each row of the plurality of rows includes a plurality of pixels, a row driver configured to generate a plurality of control signals, drive the plurality of rows of the pixel array using the plurality of control signals, and generate a plurality of clock signals, a row multiplexer configured to receive the plurality of clock signals, and selectively transmit one clock signal of the plurality of clock signals to the pixel array, and a data driver configured to transmit a plurality of data signals to the pixel array by column units, and each pixel of the plurality of pixels includes, a light emitting device, a shift register configured to receive the selectively transmitted clock signal from the row multiplexer, and generate a width adjusted pulse width modulation (PWM) signal based on a desired brightness level of the light emitting device, and a transistor configured to transmit a driving current to the light emitting device based on the PWM signal.

According to another aspect of at least one example embodiment of the inventive concepts, there is provided a device including a pixel array including a plurality of pixels, the plurality of pixels arranged in a plurality of rows and a plurality of columns, each pixel of the plurality of pixels including a light emitting device and a storage element, a row driver configured to generate a plurality of control signals and a plurality of clock signals, and drive the pixel array by row using the plurality of controls signals, the plurality of clock signals including a first clock signal, the row driver further configured to adjust a width of the first clock signal to control brightness of at least one light emitting device of the plurality of light emitting devices, and a data driver configured to output a plurality of data signals to the pixel array by column.

According to another aspect of at least one example embodiment of the inventive concepts, there is provided a pixel including a light emitting device, a NOR gate configured to receive a clock for controlling the light emitting device, a capacitor configured to store an output from the NOR gate, and a switch configured to selectively cut off an electrical connection of the NOR gate to the capacitor based on the clock signal.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Figure 1:
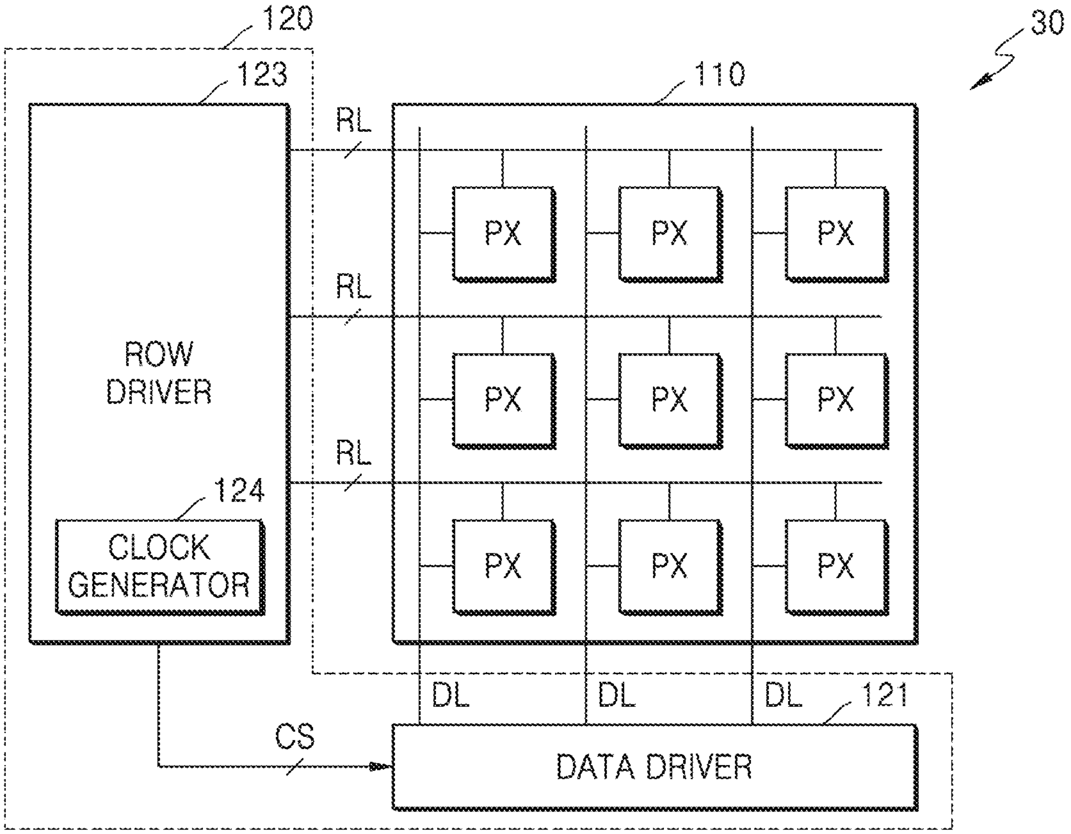
FIG. 1 is a diagram schematically illustrating a display device according to at least one example embodiment of the inventive concepts.

Hereinafter, various example embodiments of the inventive concepts will be described with reference to the accompanying drawings. In describing with reference to the drawings, the same or corresponding components are given the same reference numerals, and repeated descriptions thereof are omitted.

FIG. 1 is a diagram schematically illustrating a display device 30 according to at least one example embodiment of the inventive concepts.

Referring to FIG. 1, the display device 30 may include a pixel array 110 and/or a pixel driver 120, etc., but the example embodiments are not limited thereto, and for example, the display device 30 may include a greater or lesser number of constituent elements, etc.

The pixel array 110 may display at least one image based on an n-bit digital image signal for displaying 1 to $2^n$ gray scales, etc., but the example embodiments are not limited thereto. The pixel array 110 may include a plurality of pixels PX arranged in various patterns, such as a certain pattern (e.g., a desired pattern, etc.), for example, a matrix type and/or a zigzag type, etc., but is not limited thereto. The pixel PX may emit light (and/or an optical signal) of one color and/or may emit an optical signal of one color among, for example, red, blue, green, and/or white, etc., but is not limited thereto. For example, the pixel PX may emit optical signals of colors other than red, blue, green, and white.

The pixel PX may include at least one light emitting device, etc. The light emitting device may be a self-luminous device. For example, the light emitting device may be a light emitting diode (LED), but is not limited thereto. The light emitting device may be an LED having a micro to nano unit scale (and/or size), but is not limited thereto. The light emitting device may emit light having a single peak wavelength and/or emit light having a plurality of peak wavelengths.

The pixel PX may further include a pixel circuit connected to the light emitting device. The pixel circuit may include at least one thin film transistor (TFT) and/or at least one capacitor, but the example embodiments are not limited thereto. The pixel circuit may be implemented by a semiconductor stack structure on a substrate, but is not limited thereto.

The pixel PX may include a storage element for receiving and/or storing data (e.g., data signals) from a data driver 121 in response to a data clock signal D_CLK. The storage element may also output the stored data as a pulse width modulation (PWM) signal in response to a PWM clock signal P_CLK, but the example embodiments are not limited thereto. In some example embodiments, the storage element may include, for example, a shift register, a flip-flop, a 1-bit memory, a 2-bit memory, and/or a capacitor, etc., but is not limited thereto. Also, the pixel PX may include a device related to characteristics according to at least one example embodiment of selectively applying VDDH and/or VDDL voltages, but is not limited thereto.

The pixel driver 120 may drive and/or control the pixel array 110, etc. The pixel driver 120 may include the data driver 121 and/or a row driver 123, etc., but is not limited thereto. The data driver 121 may drive the pixel array 110 by column units. The row driver 123 may drive the pixel array 110 by row units.

The data driver 121 may receive image data of at least one frame from the outside (e.g., an external source, a graphics controller, etc.), extract a gray level for each pixel PX, and/or convert the extracted gray level into digital data having a certain (e.g., desired) number of bits, but is not limited thereto. According to at least one example embodiment, the digital data may be corrected by a gamma value set using a gamma curve, but is not limited thereto.

The data driver 121 may be connected to the plurality of pixels PX of the pixel array 110 through a plurality of data lines DL. The data driver 121 may provide digital data (e.g., a plurality of data signals) to each pixel PX by column units, etc. The data driver 121 may transmit the digital data, starting from the most significant bit (MSB) to the least significant bit (LSB), to each pixel PX in a certain and/or desired order, but is not limited thereto. The data driver 121 may provide a bit value of the digital data to each pixel PX for each frame. The bit value may have a low level or a high level (e.g., “0” or “1” value).

One frame may include a plurality of subframes. When the display device 30 displays n-bit image data, one frame may include n subframes, and each of the n subframes may correspond to each bit of the n-bit image data, but the example embodiments are not limited thereto. A period of each subframe may be different, but is not limited thereto, and for example the period of one or more subframe may be the same. For example, a period (e.g., time period) of a subframe corresponding to the MSB of the digital data may be set to be the longest and a period of the subframe corresponding to the LSB may be set to be the shortest, but the example embodiments are not limited thereto. The order of the MSB to the LSB of the digital data may correspond to the order of a first subframe to an nth subframe, respectively, but the example embodiments are not limited thereto, and for example, the order of the subframes may be set in various (other) manners, etc.

The row driver 123 may generate control signals and/or clock signals for driving and/or controlling the pixel array 110, etc. The control signals may include enable signals for controlling the pixels PX, but are not limited thereto. For example, the control signals may be signals for sequentially driving a plurality of rows of the pixel array 110, etc. The control signals may include a write enable signal WEN for enabling data to be written into the storage element of the pixel PX, a clock select signal C_SEL for selecting a clock signal input to the pixel PX, and/or a PWM enable signal P_EN for controlling a driving current flowing through the light emitting device using the PWM signal, etc. The control signals may activate the pixel array 110 by row units, etc. The control signals may be transmitted to the pixel array 110 using a plurality of row lines RL. The row driver 123 may generate a control signal CS for controlling the data driver 121 and/or transmit the generated control signal CS to the data driver 121, but is not limited thereto. For example, the control signal CS for controlling the data driver 121 may include a signal for selecting one of the data lines DL, etc.

The row driver 123 may further include a clock generator 124 for generating clock signals, but is not limited thereto. The clock generator 124 may generate a data clock signal D_CLK for receiving and/or storing data from the data driver 121, and/or a PWM clock signal P_CLK for outputting the stored data as a PWM signal, but the example embodiments are not limited thereto. According to at least one example embodiment, the clock generator 124 may toggle the PWM clock signal P_CLK for each subframe during one frame, but the example embodiments are not limited thereto. A toggle cycle may be equal to a period (e.g., a desired time period) of the corresponding subframe, etc. The clock generator 124 may transmit clock signals to each pixel PX using the row lines RL, but is not limited thereto.

Each component of the pixel driver 120 may be formed as a separate integrated circuit (IC) chip or two or more of the components of the pixel driver 120 may be formed as a single IC chip, etc. The pixel driver 120 may be directly mounted on a substrate on which the pixel array 110 is formed, may be mounted on a flexible printed circuit film, may be attached as a tape carrier package (TCP) on the substrate, and/or may be directly formed on the substrate, etc. In at least one example embodiment, the data driver 121 may be connected as an IC chip to the pixel array 110, and the row driver 123 may be directly formed on the substrate, but the example embodiments are not limited thereto.

Figure 2:
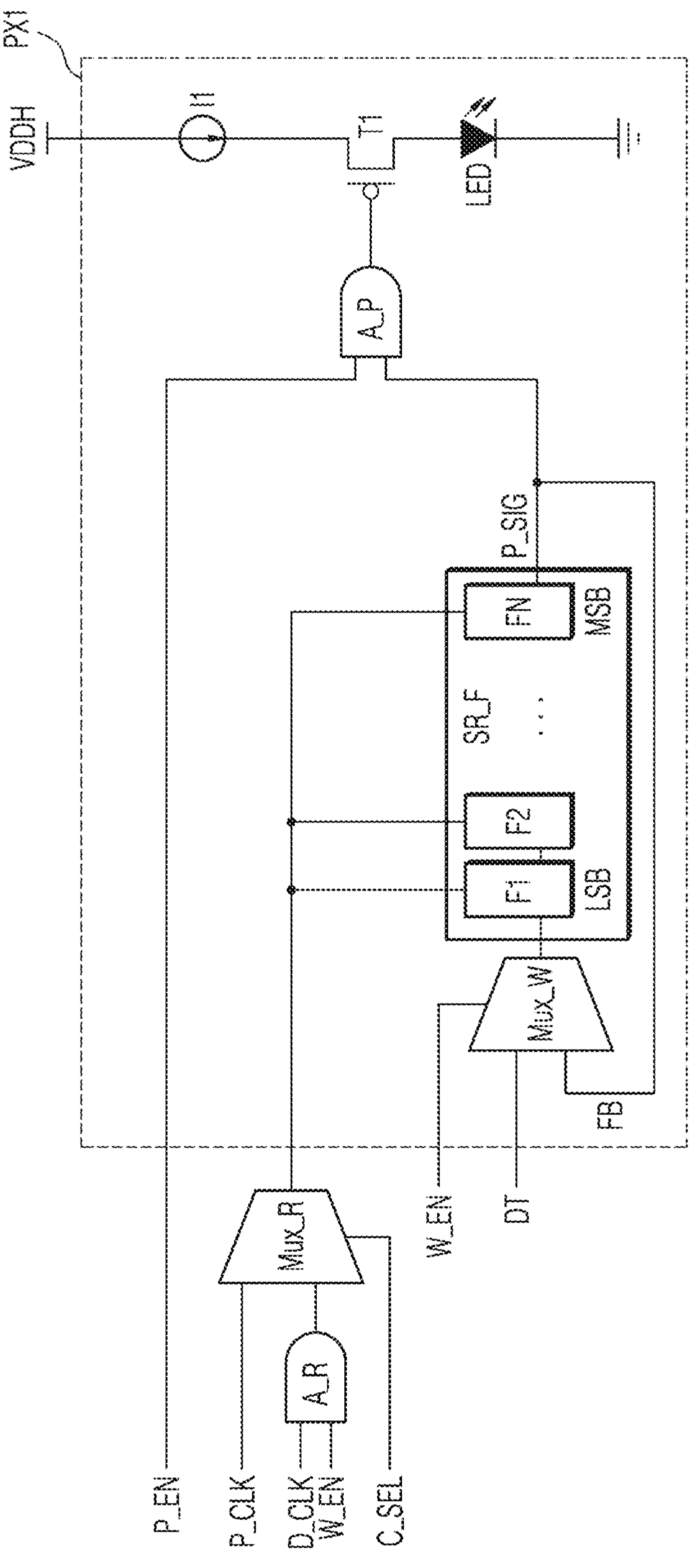
FIG. 2 is a diagram illustrating a pixel according to at least one example embodiment of the inventive concepts.

FIG. 2 is a circuit diagram illustrating a pixel PX1 according to at least one example embodiment of the inventive concepts. FIG. 2 illustrates an example of the pixel PX (e.g., the pixel PX1) of FIG. 1.

Referring to FIG. 2, according to at least one example embodiment, the pixel PX1 may include a write mux (e.g., a multiplexer) Mux_W, a shift register SR_F, a pixel AND gate A_P, a transistor T1, a current source I1, and/or a light emitting device LED, etc., but the example embodiments are not limited thereto. The pixel PX1 may be electrically connected to a row mux Mux_R, and the row mux Mux_R may receive an output from a row AND gate A_R, etc.

The shift register SR_F may sequentially store and/or output bits included in data DT received from, e.g., the data driver 121 of FIG. 1 through the data line DL, but the example embodiments are not limited thereto. The shift register SR_F may store bit values from the MSB to the LSB of the data DT according to (e.g., based on) a certain and/or desired order. For example, the shift register SR_F may store the data DT in an order of the MSB to the LSB, but the example embodiments are not limited thereto. The shift register SR_F may receive data serially and/or output data serially. However, the example embodiments of the inventive concepts are not limited thereto, and the data may be input and/or output in parallel, etc. The shift register SR_F may store at least one bit of data. In at least one example embodiment, the shift register SR_F may be an n-bit memory, where n is an integer of 1 or greater. The shift register SR_F may be implemented as N flip-flops F1 to FN. N may be an integer of 1 or greater. For example, the shift register SR_F may include 8 flip-flops (N=8), but the example embodiments are not limited thereto. The MSB of the data DT may be stored in an N-th flip-flop FN, and the LSB of the data DT may be stored in a first flip-flop F1. In at least one example embodiment, the MSB of the data DT may be stored in the first flip-flop F1, and the LSB of the data DT may be stored in the N-th flip-flop FN, etc. The N-th flip-flop FN may be a flip-flop outputting a PWM signal P_SIG, but is not limited thereto.

The data DT may be input to the shift register SR_F through and/or using the write mux Mux_W. The write mux Mux_W may receive the data DT and feedback data FB as data which has been stored in the N-th flip-flop FN of the shift register SR_F and which is provided as feedback from the shift register SR_F. The write mux Mux_W may receive a write enable signal W_EN from a row driver, such as the row driver 123 of FIG. 1, etc., through the row line RL, but the example embodiments are not limited thereto. The write enable signal W_EN may be a signal for selecting one of the data DT and the feedback data FB. Accordingly, the data DT and the feedback data FB may not overlap, and one of the data DT or the feedback data FB may be input to the shift register SR_F at a time, but the example embodiments are not limited thereto.

The shift register SR_F may receive a clock signal through the row mux Mux_R located outside the pixel PX1 (e.g., external to the pixel PX1). The row mux Mux_R may receive a PWM clock signal P_CLK and/or a data clock signal D_CLK, and may output a clock signal selected from the PWM clock signal P_CLK and/or a data clock signal D_CLK, and/or based on the PWM clock signal P_CLK and/or a data clock signal D_CLK, etc.

The data clock D_CLK may be a clock for storing the data DT in the flip-flops F1 to FN. The PWM clock signal P_CLK may be a clock signal for generating the PWM signal P_SIG, which is an output signal of the shift register SR_F. The PWM clock signal P_CLK may toggle for each subframe during one frame, but is not limited thereto. The PWM signal P_SIG will be described in detail with reference to FIG. 5.

According to at least one example embodiment, the output signal of the row AND gate A_R may be input to the row mux Mux_R. The row AND gate A_R may be controlled by the data clock signal D_CLK and/or the write enable signal W_EN. Accordingly, when both the data clock signal D_CLK and the write enable signal W_EN have a high level, the row AND gate A_R will output a high level signal to the row mux Mux_R. The write enable signal W_EN and the clock select signal C_SEL may be control signals generated by the row driver 123, but the example embodiments are not limited thereto.

The clock select signal C_SEL may be a control signal for selecting one of the PWM clock signal P_CLK and the data clock signal D_CLK. Accordingly, the PWM clock signal P_CLK and the data clock signal D_CLK may not overlap (e.g., are not output simultaneously), and may be input to the shift register SR_F.

An output from the row mux Mux_R may be transmitted to the shift register SR_F. The output from the row mux Mux_R may be transmitted to each of the flip-flops F1 to FN, but the example embodiments are not limited thereto. Accordingly, each of the flip-flops F1 to FN may store the data DT and/or generate the PWM signal P_SIG in response to a control signal received from the row mux Mux_R. The shift register SR_F may store the bit value of the data DT for each frame during a data write period, and may generate the PWM signal P_SIG based on the bit value stored during a light emission period and the PWM clock signal P_CLK, etc.

The PWM signal P_SIG output from the shift register SR_F may be input and/or transmitted to the pixel AND gate A_P. The pixel AND gate A_P may also receive the PWM enable signal P_EN. Accordingly, an output from the pixel AND gate A_P may have a high level when both the PWM signal P_SIG and the PWM enable signal P_EN have a high level.

The output from the pixel AND gate A_P may be connected to a gate of the transistor T1. One end of the transistor T1 may be connected to the current source I1, and the other end of the transistor T1 may be connected to the light emitting device LED. The current source I1 may be connected to a high level source voltage VDDH and provide a driving current, but is not limited thereto. The transistor T1 may be turned on or turned off according to and/or based on the PWM signal P_SIG to transmit or cut off the driving current to the light emitting device LED. When the transistor T1 is turned on, the driving current output from the transistor T1 may be transferred to the light emitting device LED so that the light emitting device LED emits light, and when the transistor T1 is turned off, the driving current output from the transistor T1 is cut off, and the light emitting device LED does not emit light, etc. A light emission time of the light emitting device LED may be adjusted according to and/or based on a turn-on time and/or a turn-off time of the transistor T1 (e.g., based on a duty cycle of the transistor T1, etc.). During one frame, the light emission time and a non-light emission time of the light emitting device LED are controlled by and/or based on the turn-on time and turn-off time of the transistor T1, so that a color depth of the pixel PX1 may be expressed, etc. The transistor T1 may be a P-type transistor or an N-type transistor. As shown in FIG. 2, the transistor T1 may be a P-type transistor. Accordingly, the transistor T1 may be turned on by a low level voltage, but the example embodiments are not limited thereto.

In at least one example embodiment, by forming the pixel PX1 including the shift register SR_F which selectively receives one of the data clock signal D_CLK and the PWM clock signal P_CLK, the pixel circuit may include a transistor operated by and/or controlled by a low level voltage. Because the size of the transistor operated by a low level voltage is smaller than that of a transistor operated by high level voltage, a physical area of the pixel PX1 may be reduced. Accordingly, when pixel arrays having the same layout area (e.g., a same physical area and/or same physical dimensions, etc.), a pixel circuit including a transistor operated by a low level voltage may provide a display device having a higher resolution and/or a higher pixel density, as well as lower power consumption, than a pixel circuit including a transistor operated by a high level voltage.

In addition, because the PWM signal P_SIG may be formed without a separate counter and comparator circuit, the number of devices and/or components used and the number of signal lines for transmitting control signals may be also reduced. Accordingly, a structure of the pixel circuit may be simplified, and the manufacturing yields for the pixel circuit may be increased and/or costs for manufacturing pixels, pixel arrays, and/or display panels may be reduced, etc.

Figure 3:
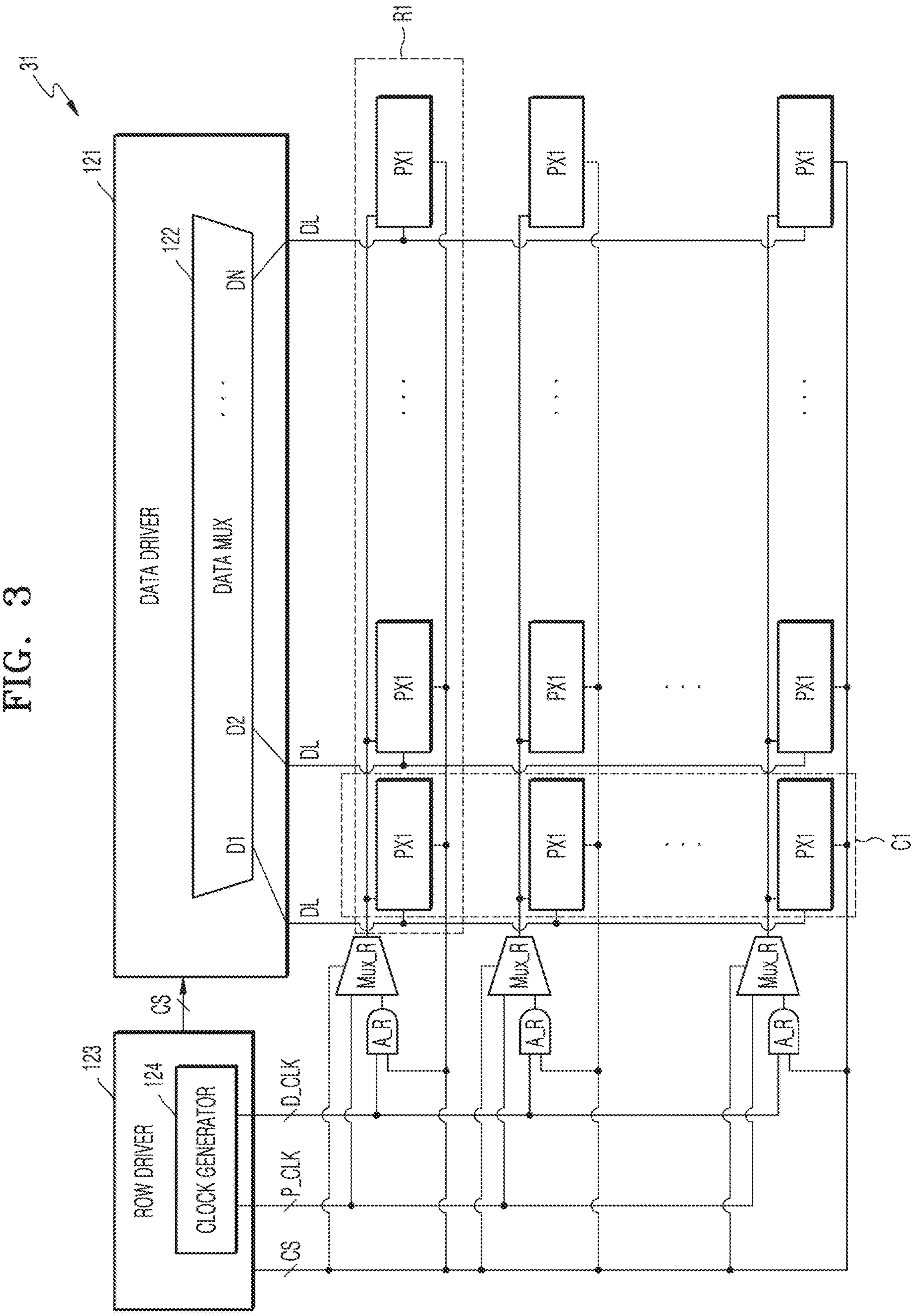
FIG. 3 is a diagram schematically illustrating a display device according to at least one example embodiment of the inventive concepts.

FIG. 3 is a circuit diagram schematically illustrating a display device according to at least one example embodiment of the inventive concepts. FIG. 3 illustrates a display device 31 including the pixel PX1 illustrated in FIG. 2, but the example embodiments are not limited thereto.

Referring to FIG. 3, the display device 31 may include a data driver 121, a data mux 122, a row driver 123, a clock generator 124, a row mux Mux_R, a row AND gate A_R, and/or a plurality of pixels PX1, etc., but the example embodiments are not limited thereto, and for example, the display device 31 may include a greater or lesser number of constituent components.

According to at least one example embodiment, the data driver 121 may further include the data mux 122, etc. The data mux 122 may transmit data to the pixels PX1 by column units. That is, the pixels PX1 may share the data line DL by column units, etc. Data (e.g., first to N-th data D1, D2, . . . , DN) transmitted by the data mux 122 by column units may sequentially include data to be stored in each row, but the example embodiments are not limited thereto. For example, the first data D1 may be serially output through the data line DL and may be sequentially stored in each pixel PX1 of a first column C1 in units of N bits, etc. When the pixel PX1 includes, for example, an 8-bit shift register, the first data D1 may be sequentially stored in each pixel of the first column C1 in units of 8 bits, but the example embodiments are not limited thereto, and other number of bits may be used for the shift register, etc. When the pixel PX1 includes a 1-bit memory, the first data D1 may be sequentially stored in each pixel PX1 of the first column C1 in units of 1 bit, etc.

The row driver 123 may generate a plurality of control signals CS. The plurality of control signals CS may activate the data driver 121 and/or the pixels PX1, etc. The control signals CS transmitted to the data driver 121 may include a data write signal for controlling the data driver 121 to write data and/or a column select signal which is used by the data driver 121 to select a column to transmit data, etc. The control signals CS transmitted to the pixel PX1 may include the write enable signal W_EN, the PWM enable signal PEN, and/or the clock select signal C_SEL, etc., as described with reference to FIG. 2, but the example embodiments are not limited thereto.

The clock generator 124 may generate a plurality of clock signals. The clock signals may include a data clock signal D_CLK and/or a PWM clock signal P_CLK, etc. The clock generator 124 may transmit the data clock signal D_CLK to the row AND gate A_R and the PWM clock signal P_CLK to the row mux Mux_R, etc. The row mux Mux_R may selectively transmit one of the data clock signal D_CLK output from the row AND gate A_R or the PWM clock signal P_CLK output from the clock generator 124 to the pixels PX1. The data clock signal D_CLK may be sequentially transmitted to the rows, but the example embodiments are not limited thereto. Accordingly, the rows may sequentially store bit values of data, etc. The PWM clock signal P_CLK may be sequentially transmitted to the rows. Accordingly, the rows may sequentially output the PWM signal P_SIG.

The plurality of pixels PX1 of the pixel array may share the row mux Mux_R and the row AND gate A_R by row units. The plurality pixels PX1 positioned in one of the rows of the pixel array may share the row mux Mux_R and the row AND gate A_R, but is not limited thereto. Accordingly, one row of the pixel array may include one row mux Mux_R and one row AND gate A_R, etc. For example, the pixels PXs disposed in a first row R1 may share the row mux Mux_R and the row AND gate A_R, etc.

Figure 4:
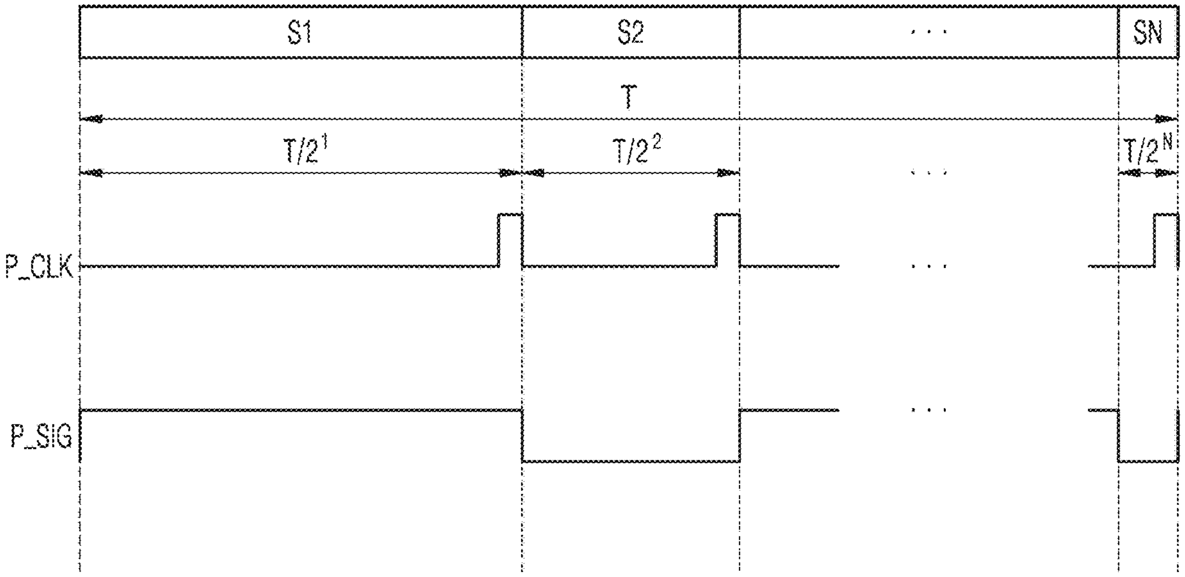
FIG. 4 is a timing diagram illustrating an operation according to at least one example embodiment of the inventive concepts.

FIG. 4 is a timing diagram illustrating an operation according to at least one example embodiment of the inventive concepts. FIG. 4 is a timing diagram illustrating the PWM clock signal P_CLK and the PWM signal P_SIG, and shows the PWM clock signal P_CLK and the PWM signal P_SIG timings for one frame period, but the example embodiments are not limited thereto.

Referring to FIG. 4, according to at least one example embodiment, a single frame (e.g., a single image frame, etc.) may include a plurality of subframes S1 to SN (e.g., first to N-th subframes), where N is an integer greater than zero. The subframes S1 to SN may operate during a first period T, but are not limited thereto. The first period T may refer to a period in which the light emitting device LED emits light for one frame, etc.

The number of subframes S1 to SN may be the same as the number N of flip-flops included in the shift register SR_F, but are not limited thereto. For example, when there are 8 flip-flops (N=8), the number of subframes may also be 8, but the example embodiments are not limited thereto.

The length of one or more of the periods of the subframes S1 to SN may be different from each other, but the example embodiments are not limited thereto. A period of each of the subframes S1 to SN may be equal to a period $T/2^n$ obtained by dividing the first period T by $2^n$, but the example embodiments are not limited thereto. The first period T may refer to a period during which the light emitting device LED emits light (e.g., an ON period) or does not emit light (e.g., an OFF period) during one frame by the PWM clock signal P_CLK. According to at least one example embodiment "n" may be 1 or greater and may be an integer equal to or less than the number of flip-flops (N), but the example embodiments are not limited thereto. Additionally, "n" may be incremented by 1 from 1 to N for each subframe and/or flip-flop included in the shift register SR_F, etc. For example, when there are 8 flip-flops (N=8), the first subframe S1 may have a period of T/2 obtained by dividing the first period T by $2^1$, and the second subframe S2 may have a period of T/4 obtained by dividing the first period T by $2^2$, etc., but the example embodiments are not limited thereto. In this manner, according to at least one example embodiment, the eighth subframe S8 may have a period of T/256 obtained by dividing the first period T by $2^8$, but the example embodiment are not limited thereto.

The PWM clock signal P_CLK may be toggled, e.g., by the clock generator 124 and/or row driver 123, etc., for each subframe, but the example embodiments are not limited thereto. The PWM clock signal P_CLK may be toggled at the end of each subframe, but is not limited thereto. In at least one example embodiment, the PWM clock signal P_CLK may be toggled every time a subframe starts, but is not limited thereto. Toggling is defined as an operation in which a clock signal transitions from a low level to a high level and then transitions back to a low level. A toggle cycle of the PWM clock signal P_CLK may be the same as the period of the subframe, but is not limited thereto. Accordingly, the PWM clock signal P_CLK may be toggled for every value $T/2^n$ obtained by dividing the first period T by $2^n$. For example, first toggling may be performed after T/2 time, and second toggling may be performed after T/4 time has elapsed (T/2+T/4) from T/2 time. The PWM clock signal P_CLK may be toggled a total of N times during the first period T. For example, when the number of flip-flops is 8 (N=8), the PWM clock signal P_CLK may be toggled a total of 8 times during the first period T, but the example embodiments are not limited thereto.

According to at least one example embodiment, the PWM signal P_SIG may be output from the shift register SR_F, but is not limited thereto. The PWM signal P_SIG may be a signal for controlling the light emitting device based on the bit value of the data DT in units of subframes and a signal width of the PWM clock signal P_CLK, etc. If the bit value of the data DT is 1, the output of the PWM signal P_SIG may have a high level equal to the signal width of the PWM clock signal P_CLK. If the bit value of the data DT is 0, the output of the PWM signal P_SIG may have a low level equal to the signal width of the PWM clock signal P_CLK.

An output level of the PWM signal P_SIG may be determined by the data DT, and a period during which the same level is output may be determined by a time width (e.g., a toggle cycle) during which the PWM clock signal P_CLK is toggled, but the example embodiments are not limited thereto. Whether the light emitting device LED emits light and a light emission time (e.g., light emission period, emission duration, ON period, etc.) of the light emitting device LED may be controlled according to and/or based on the PWM signal P_SIG, and may correspond to and/or represent a gray level indicated by the data DT, but the example embodiments are not limited thereto. That is, the data DT determines whether the light emitting device LED emits light, and the light emission time of the light emitting device LED may be controlled by the PWM clock signal P_CLK, etc.

FIG. 4 shows an example in which the data DT is input in an order of '1, 0, . . . , 0' from the MSB to the LSB, but the example embodiments are not limited thereto. The PWM signal P_SIG may have a high level or a low level depending on and/or based on a corresponding data DT each time the PWM clock signal P_CLK is toggled, and may maintain a logic level until the PWM clock signal P_CLK is toggled again, etc. For example, '1' may be input as the data DT in the first subframe S1, and accordingly, the PWM signal P_SIG may have a high level in the first subframe S1, etc. The high level may be maintained for T/2, which is a period of the first subframe S1. Subsequently, '0' may be input as the data DT during the second subframe S2, and the PWM signal P_SIG may have a low level and may be maintained for T/4, which is a period of the second subframe S2, etc. In the same manner, '0' may be input as the data DT in the N-th subframe SN, and accordingly, the PWM signal P_SIG may have a low level and may be maintained for $T/2^N$, which is a period of the N-th subframe SN, etc.

Figure 5:
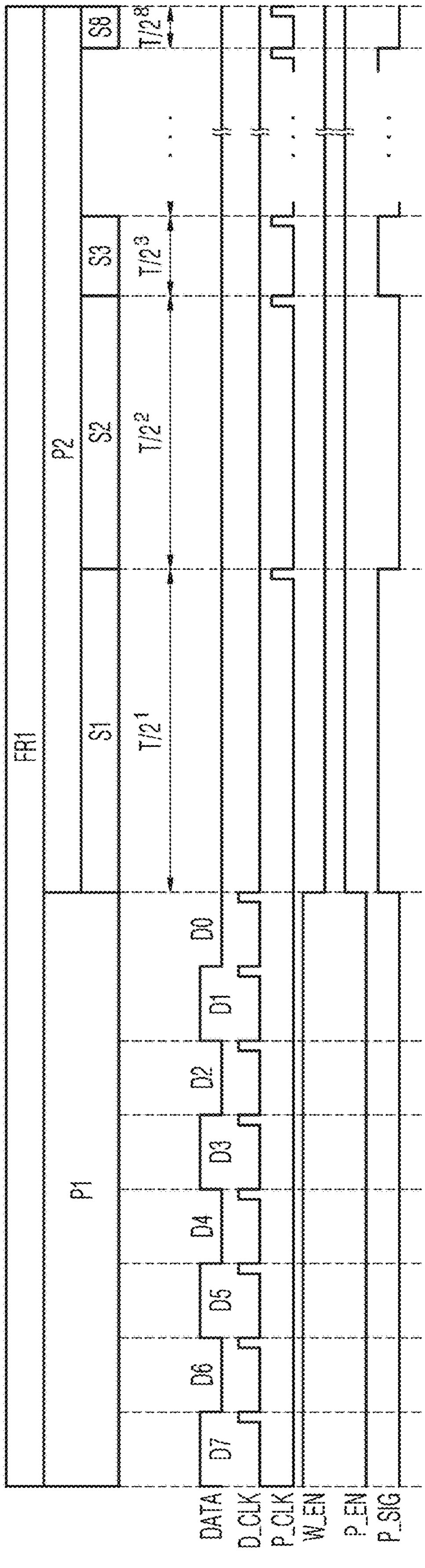
FIG. 5 is a timing diagram illustrating an operation according to at least one example embodiment of the inventive concepts.

FIG. 5 is a timing diagram illustrating an operation according to at least one example embodiment of the inventive concepts. FIG. 5 is a timing diagram illustrating an operation of, for example, the pixel PX1 of FIG. 2, and is a diagram illustrating a case in which there are eight flip-flops (N=8) as an example, but the example embodiments are not limited thereto.

Referring to FIG. 5, according to at least one example embodiment, a single frame period FR1 may include a data write period P1 and a light emission period P2, but the example embodiments are not limited thereto. The data write period P1 may be shorter than the light emission period P2, but is not limited thereto. The first period T may refer to a length of time for the light emission period P2, but is not limited thereto. The light emission period P2 may include a plurality of subframes, e.g., the subframes S1 to S8, etc., but is not limited thereto. The lengths of the periods of one or more of the subframes S1 to S8 may be different from each other, but the example embodiments are not limited thereto. The period of each of the subframes S1 to S8 may be a period $T/2^n$ obtained by dividing the first period T by $2^n$, as described above with reference to FIG. 5, but the example embodiments are not limited thereto. "n" is an integer greater than or equal to 1 and equal to or less than the number N of flip-flops, and, for example, because the number of flip-flops is 8 in at least one example embodiment, N may refer to an integer greater than or equal to 1 and equal to or less than 8, but is not limited thereto.

During the data write period P1, a plurality of bit values of data, e.g., D0 to D7, etc., may be stored in the shift register SR_F. The write enable signal W_EN may have a high level, and the data clock signal D_CLK may be toggled with a constant cycle, but the example embodiments are not limited thereto. As shown in FIG. 5, for example, the MSB (D7) to the LSB (D0) is input as '10101010', which is an example for description and is not limited thereto. In response to the write enable signal WEN and the data clock signal D_CLK, data of '10101010' may be stored in the shift register SR_F, etc. That is, during the data write period P1, bit values of the MSB D7 to the LSB of the data D0 to D7 may be written to the shift register SR_F. Until the data D0 to D7 is updated and/or refreshed, the data D0 to D7 previously stored in the shift register SR_F may be continuously used for a plurality of frames.

During the light emission period P2, the pixel PX1 may generate the PWM signal P_SIG based on the PWM clock signal P_CLK and the data, e.g., data D0 to D7, etc. During the light emission period P2, the write enable signal WEN may have a low level, but is not limited thereto. During the light emission period P2, the data clock signal D_CLK may be toggled with a constant cycle, but may not be input to the shift register SR_F by the clock select signal C_SEL, so it is illustrated as having a low level for convenience, but the example embodiments are not limited thereto.

During the light emission period P2, the PWM clock signal P_CLK may be toggled every subframe, but is not limited thereto. For example, the PWM clock signal P_CLK may be toggled at the end of each subframe, but is not limited thereto. The shift register SR_F may generate the PWM signal P_SIG in response to the stored and/or pre-stored data, e.g., data D0 to D7, etc., and the PWM clock signal P_CLK. The PWM signal P_SIG may have a high level during a period $T/2^1$ in the first subframe S1 and a low level during a period $T/2^2$ in the second subframe S2, but the example embodiments are not limited thereto. In the same manner, the PWM signal P_SIG may have a high level during the $T/2^8$ period in the eighth subframe S8, but the example embodiments are not limited thereto. A color depth (e.g., pixel color value, pixel value, gray scale value, etc.) of the light emitting device may be expressed by the PWM signal P_SIG.

Figure 6:
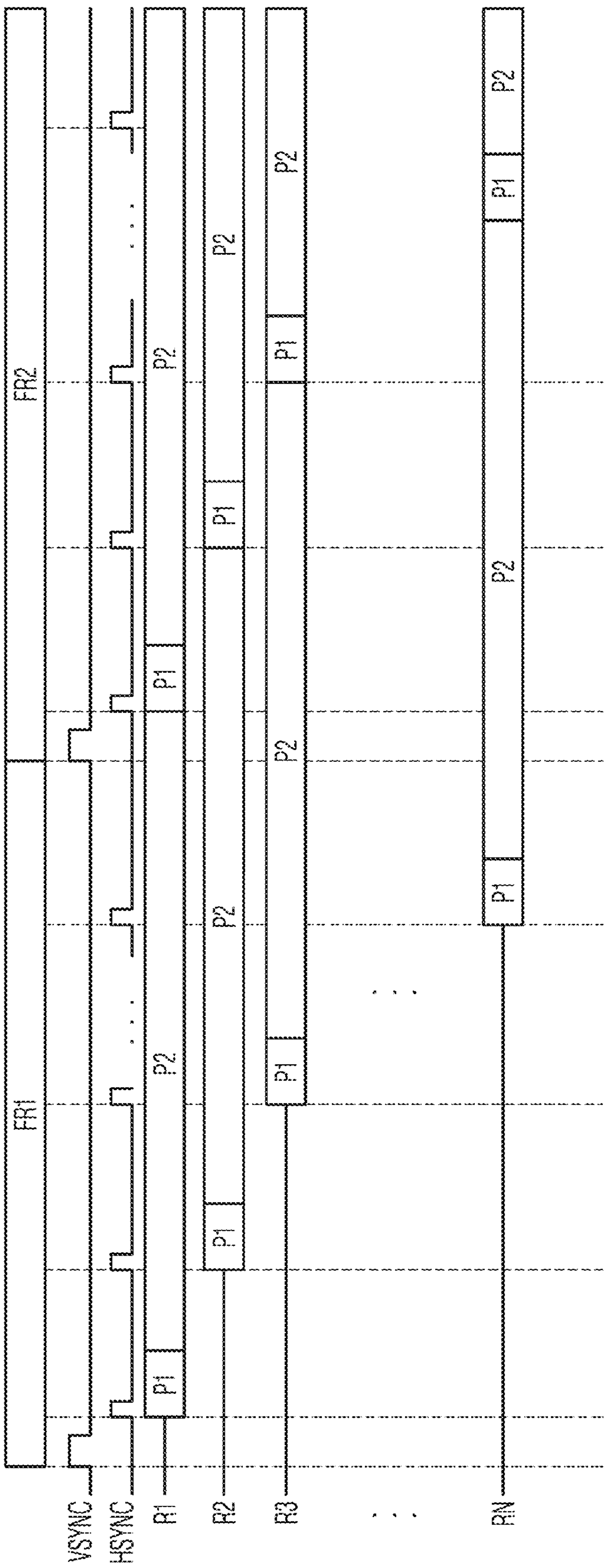
FIG. 6 is a timing diagram illustrating an operation according to at least one example embodiment of the inventive concepts.

FIG. 6 is a timing diagram illustrating an operation of a display device according to at least one example embodiment of the inventive concepts. FIG. 6 is a timing diagram illustrating the operation of the pixel array of FIG. 3, but the example embodiments are not limited thereto.

Referring to FIG. 6, according to at least one example embodiment, a first frame FR1 and a second frame FR2 may be continuous, but are not limited thereto. A frame synchronization signal VSYNC may be toggled each time a frame starts, but is not limited thereto. A row change signal HSYNC may be toggled each time a row is changed, but is not limited thereto.

For example, in the first frame FR1, after the frame synchronization signal VSYNC is toggled, the row change signal HSYNC may be toggled and the first row R1 may operate, but the example embodiments are not limited thereto. In a data write period P1, data may be sequentially stored in pixels arranged in all columns of the first row R1. A light emission period P2 of the first row R1 may proceed after the data write period P1 of the first row R1, etc.

When the row change signal HSYNC is toggled again during the light emission period P2 of the first row R1, the data write period P1 and the light emission period P2 of the second row R2 may proceed. In this manner, the data write period P1 and the light emission period P2 may proceed sequentially in the first row R1 to the nth row RN, etc.

When the frame synchronization signal VSYNC is toggled, the second frame FR2 may start and new data may be written again to the first row R1 after the light emission period P2 ends, etc. Like the first frame FR1, the data write period P1 and the light emission period P2 may sequentially proceed in the first row R1 to the nth row RN according to the row change signal HSYNC, etc.

Figure 7:
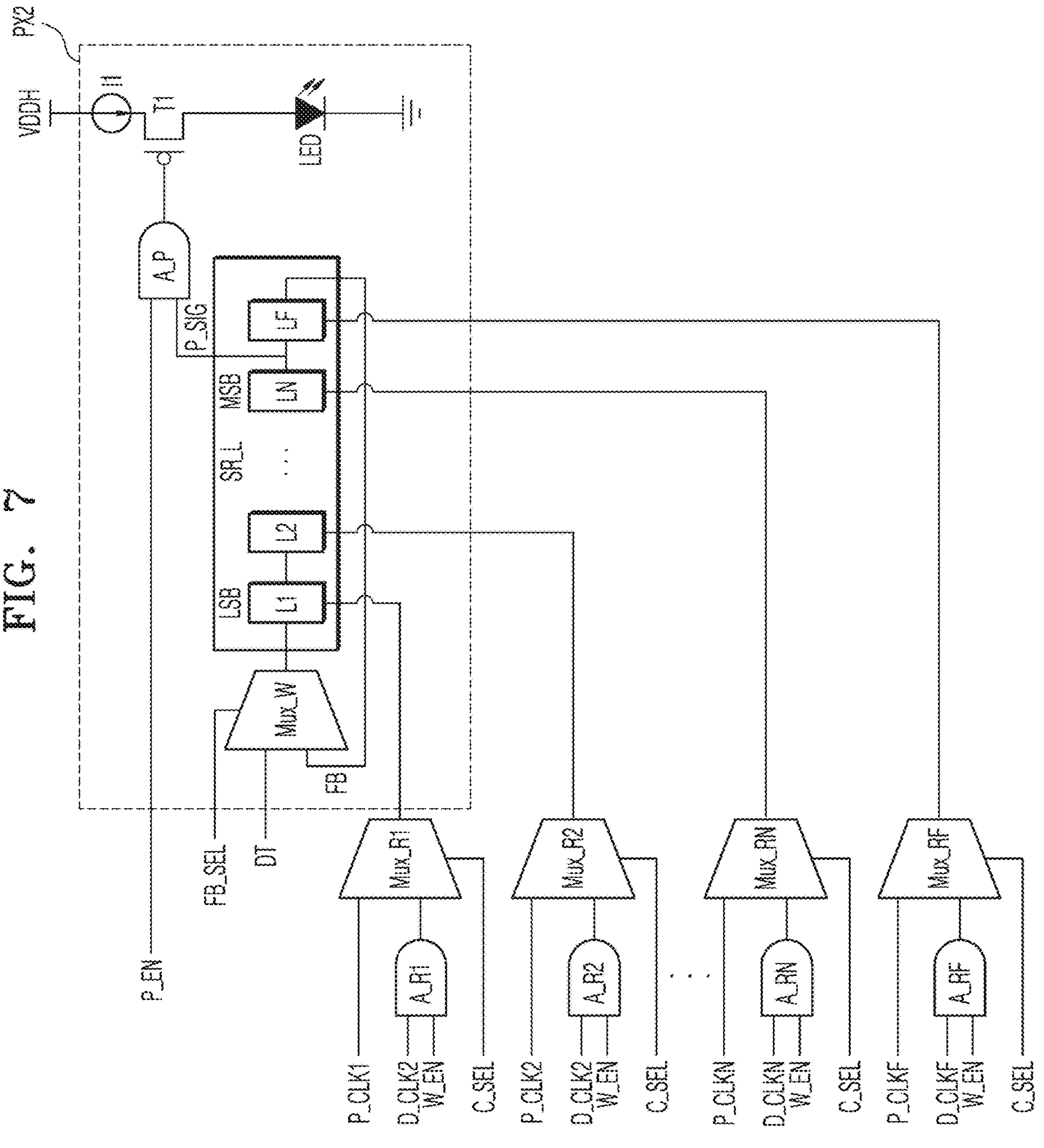
FIG. 7 is a diagram illustrating a pixel according to at least one example embodiment of the inventive concepts.

FIG. 7 is a circuit diagram illustrating a pixel PX2 according to at least one example embodiment of the inventive concepts. FIG. 7 shows an example of the pixel PX of FIG. 1, and a repeated description of the pixel PX1 of FIG. 2 is omitted, but the example embodiments are not limited thereto.

Referring to FIG. 7, according to at least one example embodiment, the pixel PX2 may include a write mux Mux_W, a shift register SR_L, a pixel AND gate A_P, and/or a transistor T1, etc., but the example embodiments are not limited thereto.

The shift register SR_L may sequentially store and output bits included in the data DT received from a data driver, such as the data driver 121 of FIG. 1, etc., through the data line DL, but the example embodiments are not limited thereto. The shift register SR_L may include a plurality of N latches, e.g., L1 to LN. N may be an integer of 1 or greater. For example, the shift register SR_L may include 8 latches (N=8), but is not limited thereto. The MSB of the data DT may be stored in an N-th latch LN, and the LSB of the data DT may be stored in a first latch L1, but is not limited thereto. In at least one example embodiment, the MSB of the data DT may be stored in the first latch L1, and the LSB of the data DT may be stored in the N-th latch LN, etc.

The shift register SR_L may further include a feedback latch LF, etc., but is not limited thereto. The feedback latch LF may be an extra latch for feeding back data stored in the N latches L1 to LN. Accordingly, the feedback latch LF may be connected to the N-th latch LN. The feedback latch LF may receive and store the bit value stored in the N-th latch LN. The N-th latch LN may be a latch outputting the PWM signal P_SIG, but the example embodiments are not limited thereto.

The data DT may be input to the shift register SR_L through and/or using the write mux Mux_W. The write mux Mux_L may receive the data DT and the feedback data FB stored in the feedback latch LF, etc. The write mux Mux_W may receive a feedback select signal FB_SEL for selecting one of the data DT and the feedback data FB. The feedback select signal FB_SEL may be generated by the row driver 123, but is not limited thereto.

The shift register SR_L may receive a plurality of clock signals through a plurality of row muxes Mux_R 1 to Mux_RN located outside (e.g., external to) the pixel PX2, but the example embodiments are not limited thereto. Each component of the row muxes Mux_R 1 to Mux_RN may be the same as the row mux Mux_R of FIG. 3, but the example embodiments are not limited thereto.

The row muxes Mux_R1 to Mux_RN may correspond to the N latches L1 to LN, respectively. The row muxes Mux_R1 to Mux_RN may be connected to the corresponding N latches L1 to LN, respectively. Accordingly, the N latches L1 to LN may receive N clock signals through the row muxes Mux_R1 to Mux_RN connected thereto, respectively. The row muxes Mux_R1 to Mux_RN may receive PWM clocks P_CLK1 to P_CLKN and the data clocks D_CLK1 to D_CLKN, and may transmit one selected clock signal there among to the shift register SR_L, but the example embodiments are not limited thereto. The PWM clocks P_CLK1 to P_CLKN and the data clocks D_CLK1 to D_CLKN will be described in detail with reference to FIG. 10. The shift register SR_L may store a bit value of the data DT in response to a clock signal received from the row muxes Mux_R1 to Mux_RN, and may generate a PWM signal P-SIG, but the example embodiments are not limited thereto. The PWM signal P-SIG may be output from the N-th latch LN, etc.

The feedback latch LF may receive a plurality of clock signals through the feedback mux Mux_RF positioned outside (e.g., external to) the pixel PX2. The components of the feedback mux Mux_RF may be the same as those of the row mux Mux_R of FIG. 3, but the example embodiments are not limited thereto. The feedback mux Mux_RF may receive a feedback clock signal P_CLKF and a feedback data clock signal D_CLKF, and may selectively transmit one of them to the feedback latch LF, etc. The feedback clock signal P_CLKF may be input before the PWM clocks P_CLK1 to P_CLKN are input to the N latches L1 to LN, but the example embodiments are not limited thereto.

Figure 8:
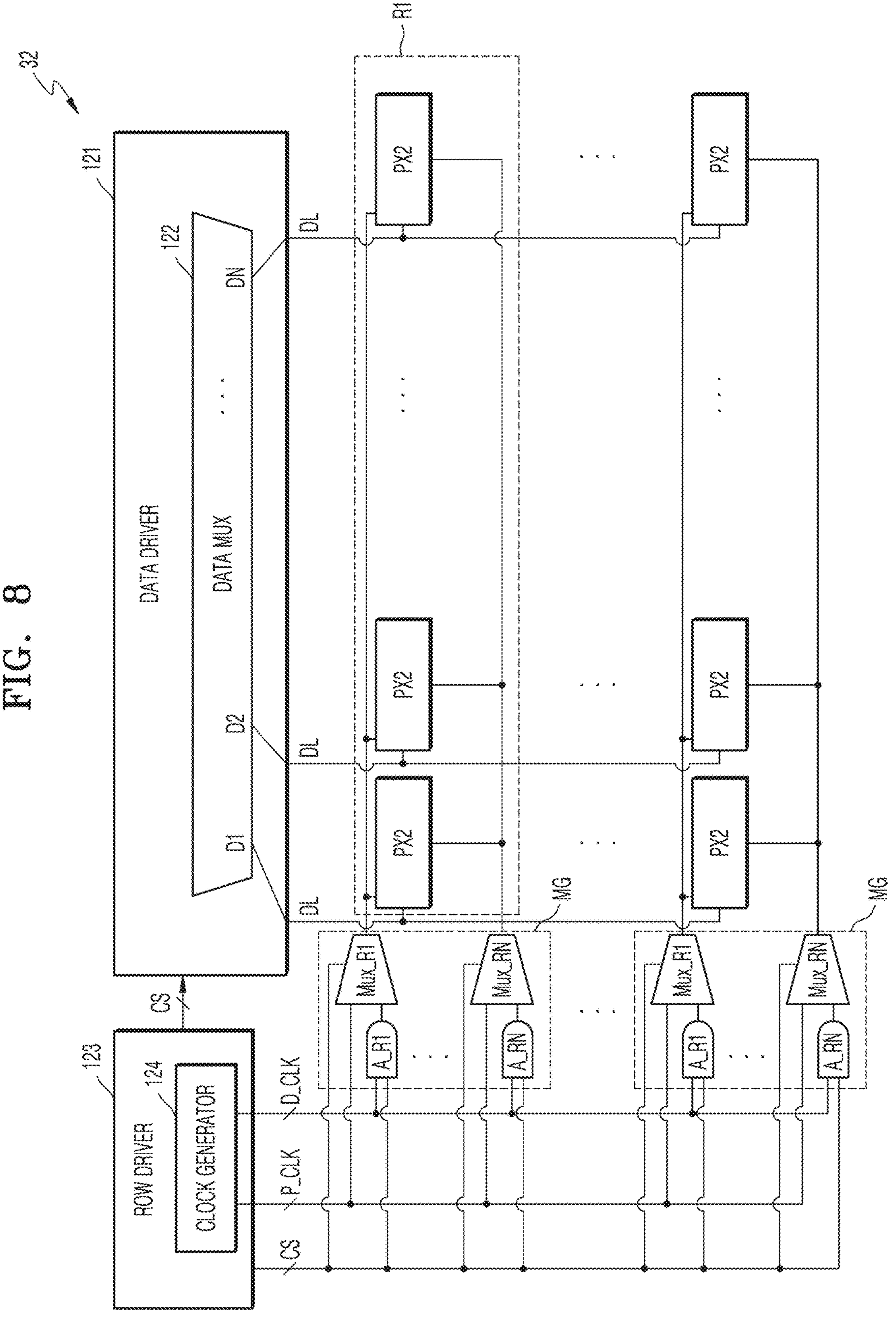
FIG. 8 is a diagram schematically illustrating a display device according to at least one example embodiment of the inventive concepts.

FIG. 8 is a circuit diagram schematically illustrating a display device according to at least one example embodiment of the inventive concepts. FIG. 8 shows a display device 32 including the pixel PX2 shown in FIG. 7 as at least one example embodiment of FIG. 3, but the example embodiments are not limited thereto.

Referring to FIG. 8, according to at least one example embodiment, the display device 32 may include a data driver 121, a row driver 123, a mux group MG, and/or a pixel PX2, etc., but the example embodiments are not limited thereto.

The mux group MG may include a plurality of row muxes Mux_R1 to Mux_RN and a plurality of row AND gates A_R1 to A_RN, but is not limited thereto. The row AND gates A_R1 to A_RN may correspond to the row muxes Mux_R1 to Mux_RN, respectively. The mux group MG may further include a feedback mux Mux_RF, and the feedback mux Mux_RF may receive an output from an AND gate.

The row muxes Mux_R1 to Mux_RN may correspond to N latches L1 to LN, respectively. The pixel array may share a mux group MG by row units. The pixels PX2 disposed in one of the rows of the pixel array may share the mux group MG. Accordingly, one row of the pixel array may be connected to one mux group, but is not limited thereto. For example, because a first row R1 may share the mux group MG, the pixels PX2 of the first row R1 may share a first mux Mux_R1 to an N-th row mux Mux_RN, which may be included in the mux group MG, etc.

Figure 9:
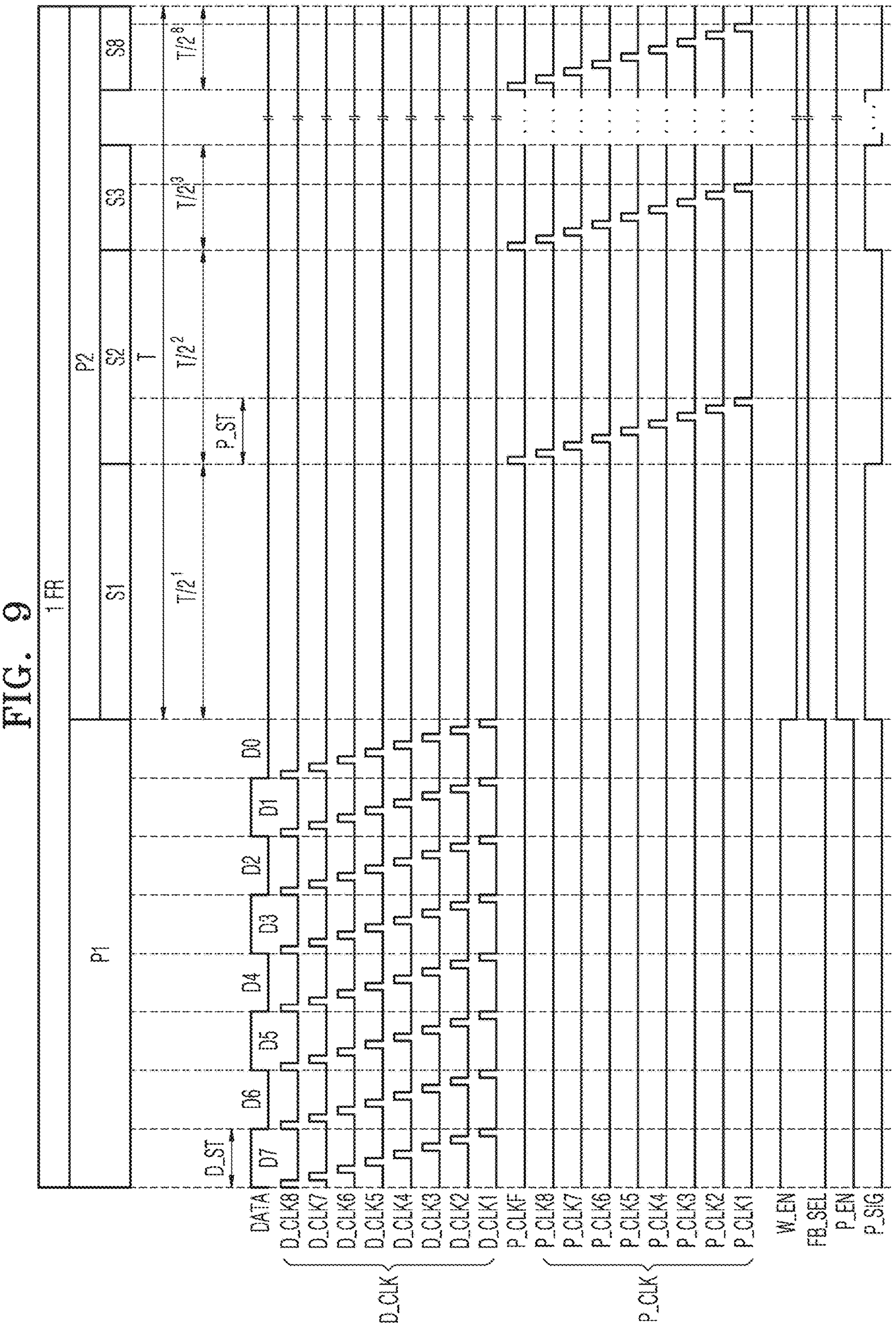
FIG. 9 is a timing diagram illustrating an operation according to at least one example embodiment of the inventive concepts.

FIG. 9 is a timing diagram illustrating an operation according to at least one example embodiment of the inventive concepts. FIG. 9 is a timing diagram illustrating an operation of the pixel PX2 of FIG. 8 and is a diagram illustrating a case in which there are eight latches (N=8) as an example, but the example embodiments are not limited thereto.

Referring to FIG. 9, according to at least one example embodiment, a single frame period FR1 may include a data write period P1 and a light emission period P2, etc., but is not limited thereto. The light emission period P2 may include a plurality of subframes, e.g., subframe S1 to S8, but is not limited thereto.

The length of periods of one or more of the subframes, e.g., subframes S1 to S8, may be different from each other, but are not limited thereto. The period of each of the subframes S1 to S8 may be the period $T/2^n$ obtained by dividing the first period T by $2^n$, as described above with reference to FIG. 5, but the example embodiments are not limited thereto. The first period T may refer to a period in which the light emitting device LED emits light or does not emit light during one frame controlled by the PWM clock signal P_CLK. The first period T may refer to a length of time of the light emission period P2. n is an integer of 1 or greater and less than or equal to the number of latches N, and may be incremented by 1 from 1 to N. Because a case in which there are 8 latches (N=8) is described as an example in at least one example embodiment, n may refer to an integer of 1 or greater and 8 or less, but the example embodiments are not limited thereto.

During the data write period P1, bit values of the data, e.g., data D0 to D7, may be stored in the shift register SR_L. During the data write period P1, the write enable signal W_EN may have a high level, but is not limited thereto.

The data clock signal D_CLK may include, e.g., first to eighth data clocks D_CLK1 to D_CLK8 input to the row muxes Mux_R1 to Mux_R8, respectively, but the example embodiments are not limited thereto. The first to eighth data clocks D_CLK1 to D_CLK8 may be sequentially toggled during a certain and/or desired period, but are not limited thereto. Toggling the first to eighth data clocks D_CLK1 to D_CLK8 sequentially for a certain and/or desired period D_ST may be defined as "serial-toggling of the data clock signal D_CLK". While the data clock signal D_CLK is serially toggled, the first to eighth data clocks D_CLK1 to D_CLK8 may be sequentially toggled without overlapping, etc. The data clock signal D_CLK may be serially toggled continuously within the data write period P1, but is not limited thereto. As shown in FIG. 9, the MSB D7 to the LSB D0 is input as "10101010", which is an example for description and is not limited thereto. During the data write period P1, in response to the write enable signal W_EN and the data clock signal D_CLK, the bit value of the MSB D7 to the LSB D0 of the data D0 to D7 may be stored in the shift register SR_L.

During the light emission period P2, the PWM signal P_SIG may be generated based on the PWM clock signal P_CLK and the data, e.g., data D0 to D7. The write enable signal W_EN may have a low level during the light emission period P2, but the example embodiments are not limited thereto. The data clock signal D_CLK may be serially toggled with a certain and/or desired cycle during the light emission period P2, but may not be input to the shift register SR_L by the clock select signal C_SEL, so the data clock signal D_CLK is illustrated as having a low level for convenience, but the example embodiments are not limited thereto.

The PWM clock signal P_CLK may include a plurality of PWM clock signals, e.g., first to eighth PWM clocks P_CLK1 to P_CLK8, etc., input to the plurality of row muxes Mux_R1 to Mux_R8, respectively, but the example embodiments are not limited thereto. The first to eighth PWM clocks P_CLK1 to P_CLK8 may be sequentially toggled during a certain and/or desired period P_ST, but are not limited thereto. For example, the seventh PWM clock signal P_CLK7 may be toggled immediately after the eighth PWM clock signal P_CLK8 is toggled, and the sixth PWM clock signal P_CLK6 may be toggled immediately after the seventh PWM clock signal P_CLK7 is toggled, but the example embodiments are not limited thereto. Toggling the first to eighth PWM clocks P_CLK1 to P_CLK8 sequentially for the certain period P_ST may be defined as "serial-toggling of the PWM clock signal P_CLK". The PWM clock signal P_CLK may be serially toggled for different cycles during the light emission period P2, but the example embodiments are not limited thereto. The PWM clock signal P_CLK may be serially toggled every subframe, but is not limited thereto. The PWM clock signal P_CLK may be serially toggled at the end of each subframe, but is not limited thereto.

A length of a period of each of the subframes, e.g., subframes S1 to S8, may be equal to a period $T/2^n$ obtained by dividing the first period T by $2^n$, but the example embodiments are not limited thereto. "n" is 1 or greater and may be an integer equal to or less than the number of latches N, but is not limited thereto. "n" may be incremented by 1 from 1 to N, but is not limited thereto. Accordingly, the first frame S1 may have a period of T/2 obtained by dividing the first period T by $2^1$, and the eighth frame S8 may have a period T/256 obtained by dividing the first period T by $2^8$, etc.

Because the serial toggling cycle of the PWM clock signal P_CLK is the same as the period of the subframe, the PWM clock signal P_CLK may be serially toggled every period $T/2^n$ obtained by dividing the first period T by $2^n$, but the example embodiments are not limited thereto. For example, first serial toggling may be performed after T/2 time, and second serial toggling may be performed after T/4 time has elapsed (T/2+T/4) from T/2 time, etc. The PWM clock signal P_CLK may be toggled a total of N times during the first period T. For example, when the number of latches is 8 (N=8), the PWM clock signal P_CLK may be serially toggled a total of 8 times during the first period T, but the example embodiments are not limited thereto.

The shift register SR_L may generate the PWM signal P_SIG in response to the stored and/or pre-stored data, e.g., data D0 to D7, and the PWM clock signal P_CLK. The PWM signal P_SIG may have a high level during a period of $T/2^1$ in the first subframe S1 and a low level during a period of $T/2^2$ in the second subframe S2, but the example embodiments are not limited thereto. In the same manner, the PWM signal may have a high level during a period of $T/2^8$ in the eighth subframe S8, but is not limited thereto. A color depth (e.g., pixel value, pixel color value, grey scale value, etc.) of the light emitting device may be expressed by the PWM signal P_SIG.

During the light emission period P2, the feedback PWM clock signal P_CLKF may be toggled every subframe, but is not limited thereto. The feedback PWM clock signal P_CLKF may be toggled at the end of every subframe, but may be toggled before the eighth PWM clock signal P_CLK8 is toggled, but the example embodiments are not limited thereto. The feedback PWM clock signal P_CLKF may be toggled in every subframe, but may be toggled immediately before the PWM clock signal P_CLK is serially toggled, but the example embodiments are not limited thereto. The feedback PWM clock signal P_CLKF may be toggled with different cycles during the light emission period P2, but is not limited thereto. The toggle cycle of the feedback PWM clock signal P_CLKF may be the same as the cycle of serial toggling of the PWM clock signal P_CLK, but is not limited thereto. As the feedback PWM clock signal P_CLKF is toggled, the bit value stored in the uppermost latch L8 may be fed back, etc.

Figure 10:
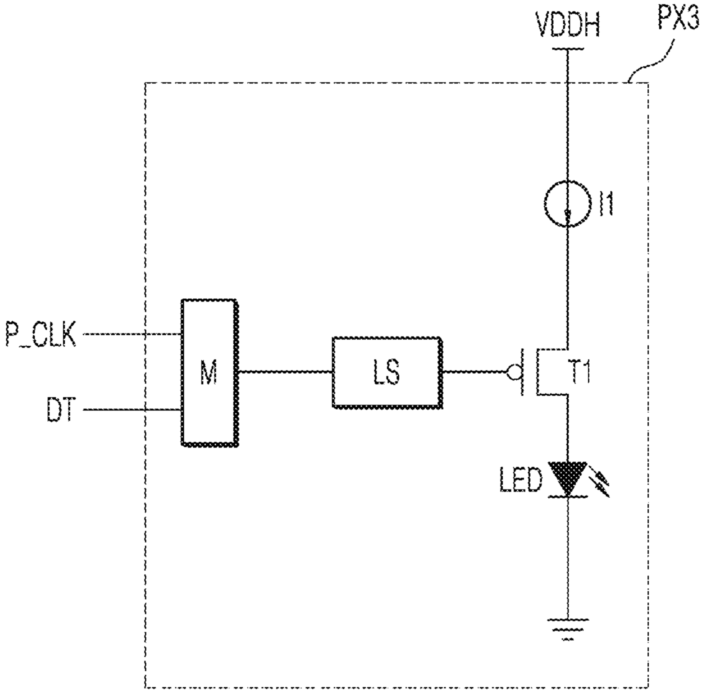
FIG. 10 is a diagram illustrating a pixel according to at least one example embodiment of the inventive concepts.

FIG. 10 is a circuit diagram illustrating a pixel PX3 according to at least one example embodiment of the inventive concepts. FIG. 10 illustrates an example of the pixel PX of FIG. 2, but the example embodiments are not limited thereto.

Referring to FIG. 10, according to at least one example embodiment, the pixel PX3 may include a storage element M, a level shifter LS, and/or a first transistor T1, etc., but the example embodiments are not limited thereto.

The storage element M may generate at least one control signal for selectively causing the light emitting device LED to emit light or to not emit light for each of the subframes S1 to SN included in one image frame based on the input data DT, and transmit the generated control signal to the first transistor T1, etc. The storage element M may receive the data DT transmitted from the data driver 121 and the PWM clock signal P_CLK transmitted from the row driver 123. The PWM clock signal P_CLK may be a clock signal having a width adjusted to control a brightness of the light emitting device LED, but is not limited thereto. The PWM clock signal P_CLK will be described in detail with reference to FIG. 11.

The storage element M may store at least a 1-bit value, etc. The storage element M may be implemented with one or a plurality of transistors. The storage element M may be implemented as one latch or one flip-flop, but is not limited thereto. The storage element M may be implemented as one piece of random access memory (RAM), for example, one piece of SRAM or DRAM, etc. Additionally, the storage element M may be implemented as a 2-bit memory, etc.

An output signal from the storage element M may be input to the level shifter LS. A signal output from the level shifter LS may have a higher level than a voltage level input to the level shifter LS, but the example embodiments are not limited thereto. The level shifter LS may include a boosting circuit boosting an input voltage, but is not limited thereto. The level shifter LS may be implemented as a plurality of transistors, but is not limited thereto.

An output signal from the level shifter LS may be input to a gate of the first transistor T1. One end of the transistor T1 may be connected to the current source I1 and the other end may be connected to the light emitting device LED to transmit or cut off a driving current to the light emitting device LED, etc.

According to at least one example embodiment, as the storage element M storing one bit value is driven using the PWM clock signal P_CLK, the physical area of the pixel PX3 may be reduced, etc.

Figure 11:
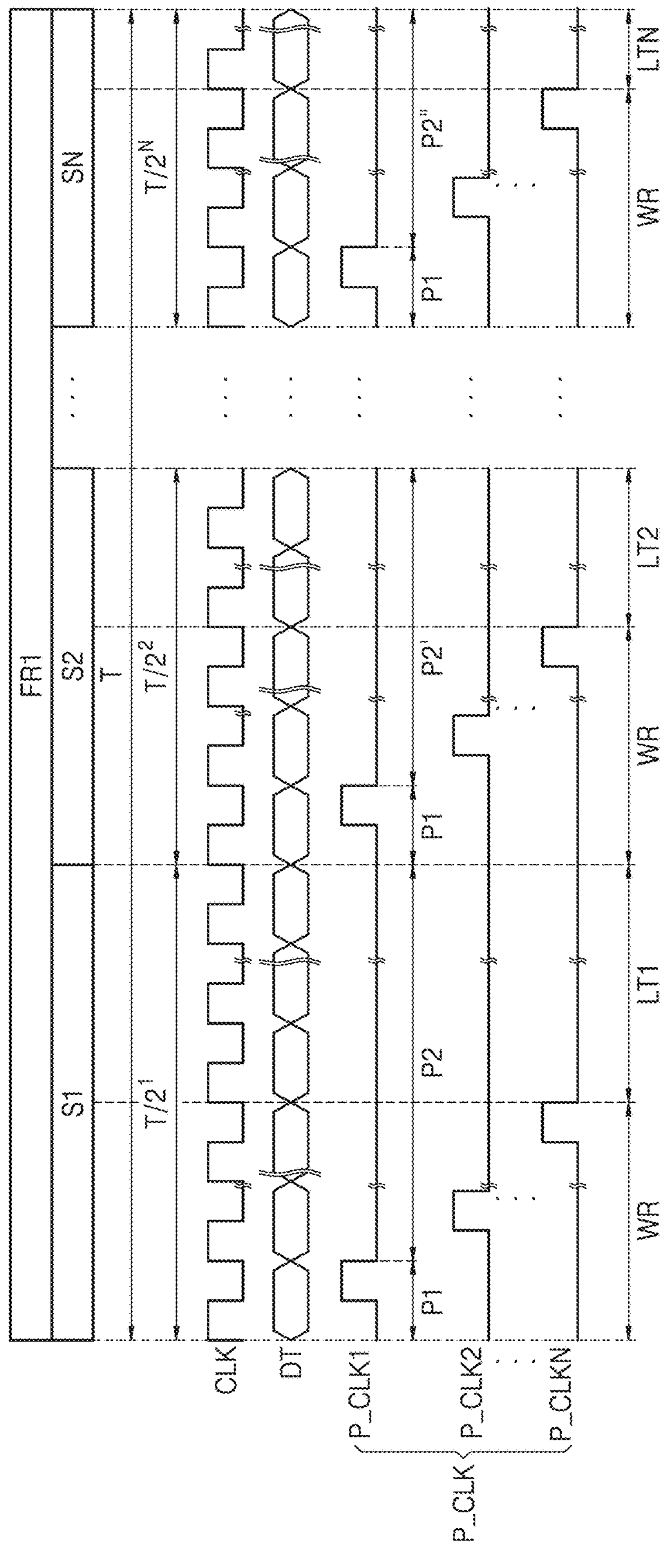
FIG. 11 is a timing diagram illustrating an operation according to at least one example embodiment of the inventive concepts.

FIG. 11 is a timing diagram illustrating an operation of a pixel according to at least one example embodiment of the inventive concepts. FIG. 11 illustrates an operation of a pixel array including the pixel PX3 of FIG. 10, but the example embodiments are not limited thereto.

Referring to FIG. 11, according to at least one example embodiment, a frame FR1 may include a plurality of subframes S1 to SN, etc. The number of subframes S1 to SN may be equal to the number N of bit values to be expressed through the storage element M, and a period of the subframes S1 to SN may be a period $T/2^n$ obtained by dividing the time T during which one frame FR1 proceeds by $2^n$, but the example embodiments are not limited thereto. "n" is 1 or greater and an integer less than or equal to the number of bit values to be expressed through the storage element M, but is not limited thereto. "n" may be incremented by 1 from 1 to N, etc.

For example, when the number of bit values sequentially stored in the storage element M is 8 (N=8), n may refer to an integer of 1 or greater and 8 or less, but the example embodiments are not limited thereto. Accordingly, one frame FR1 may include first to eighth subframes S1 to S8, and the first to eighth subframes S1 to S8 may have periods of $T/2, T/2^2, \ldots, T/2^8$, but the example embodiments are not limited thereto.

According to at least one example embodiment, the PWM clock signal P_CLK may include a first PWM clock signal P_CLK1 input to a first row, a second PWM clock signal P_CLK2 input to a second row, . . . , and/or an N-th PWM clock signal P_CLKN input to an N-th row, etc. The first PWM clock signal P_CLK to the N-th PWM clock signal P_CLKN may be sequentially transmitted to the rows. Accordingly, the rows may sequentially store data and cause the light emitting device to emit light or not to emit light.

The PWM clock signal P_CLK may be toggled at all of the subframes S1 to SN, but the example embodiments are not limited thereto. For example, the PWM clock signal P_CLK may be toggled each time the subframes S1 to SN start, but the example embodiments are not limited thereto. Accordingly, the PWM clock signal P_CLK may be toggled every time $T/2^n$ obtained by dividing the time T during which one frame FR1 proceeds by $2^n$ (n is an integer greater than or equal to 1 and less than or equal to N), but the example embodiments are not limited thereto. Because the subframes S1 to SN have different periods, the PWM clock signal P_CLK may be toggled with different time widths, but are not limited thereto.

Data may be stored in the storage element M during the first period P1 during which the PWM clock signal P_CLK is toggled, and the light emitting device LED may emit light or may not emit light in the remaining subframe period P2, but the example embodiments are not limited thereto. In the plurality of pixels PX3 arranged in each row of the pixel array, data may be sequentially stored during the first period P1, and the light emitting device may be turned on or off during the second period P2, but the example embodiments are not limited thereto.

The first period P1 may be constant for each of the subframes S1 to SN, and the second period P2 may be different for each of the subframes S1 to SN, but the example embodiments are not limited thereto. For example, the second period P2 of the first subframe S1 may be longer than a second period P2' of the second subframe S2, and the second period P2' of the second subframe S2 may be longer than a second period P2" of the N-th subframe SN, but the example embodiments are not limited thereto.

The plurality of subframes S1 to SN may include a data write period WR and/or light emission periods LT1 to LTN, etc. The data write period WR may refer to a period during which data is input to all rows of the pixel array, and the light emission periods LT1 to LTN may refer to periods during which light emitting devices of all rows of the pixel array are turned on or off. During the data write period WR, the first to n-th rows may sequentially receive the plurality of PWM clocks P_CLK1, P_CLK2, . . . , P_CLKN. Accordingly, data may be sequentially stored in the pixels PX3 arranged in the first to n-th rows during the data write period WR, etc.

The data write periods WR of the plurality of subframes S1 to SN may be the same, and the light emission periods LT1 to LTN may be different from each other, but the example embodiments are not limited thereto. The light emission periods LT1 to LTN of the subframes S1 to SN may vary to correspond to the periods of the subframes S1 to SN, respectively, but the example embodiments are not limited thereto. For example, a light emission period LT1 of the first subframe S1 may be longer than a light emission period LT2 of the second subframe S2, but are not limited thereto.

Figure 12:
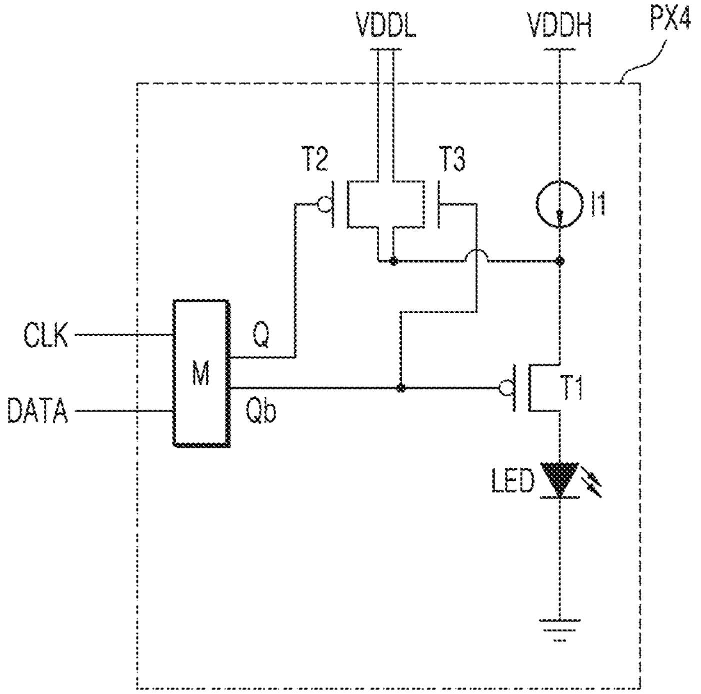
FIG. 12 is a diagram illustrating a pixel according to at least one example embodiment of the inventive concepts.

FIG. 12 is a circuit diagram illustrating a pixel PX4 according to at least one example embodiment of the inventive concepts. FIG. 12 illustrates an example of the pixel PX of FIG. 1, but the example embodiments are not limited thereto. FIG. 12 shows another example embodiment of the pixel PX3 of FIG. 10, and a repeated description thereof is omitted, but the example embodiments are not limited thereto.

Referring to FIG. 12, according to at least one example embodiment, the pixel PX4 may include a storage element M, a current source I1, a light emitting device LED, a transistor T1, a second transistor T2, and/or a third transistor T3, etc., but the example embodiments are not limited thereto. The second transistor T2 and the third transistor T3 may replace a "level shifter", but the example embodiments are not limited thereto.

The second transistor T2 and the third transistor T3 may be N-type transistors or P-type transistors, and the second transistor T2 and the third transistor T3 may be different types of transistors, but are not limited thereto. As shown in FIG. 12, the second transistor T2 may be a P-type transistor, and the third transistor T3 may be an N-type transistor, but are not limited thereto.

The second transistor T2 may receive an output Q from the storage element M by a gate of the second transistor T2. The second transistor T2 may receive a low level source voltage VDDL by one end, and the other end of the second transistor T2 may be connected to the current source I1 generating a driving current based on the high level source voltage VDDH, etc.

The third transistor T3 may receive a signal Qb complementary to the output Q from the storage element M through a gate of the third transistor T3, etc. A low level source voltage VDDL may be applied from one end of the third transistor T3, and the other end of the third transistor T3 may be connected to the current source I1, but the example embodiments are not limited thereto.

According to at least one example embodiment, the level shifter LS includes the second transistor T2 and the third transistor T3, and when the light emitting device LED is turned off, a low level source voltage VDDL may be applied to the first transistor T1, and when the light emitting device LED is turned on, the first transistor T1 is applied with a voltage having a magnitude equal to a forward voltage of the light emitting device LED, so that the first transistor T1 may be driven at a low level, etc. Accordingly, an area of the pixel PX4 may be reduced due to the light emitting device LED being driven using a low voltage level compared to conventional light emitting devices, etc.

Figure 13:
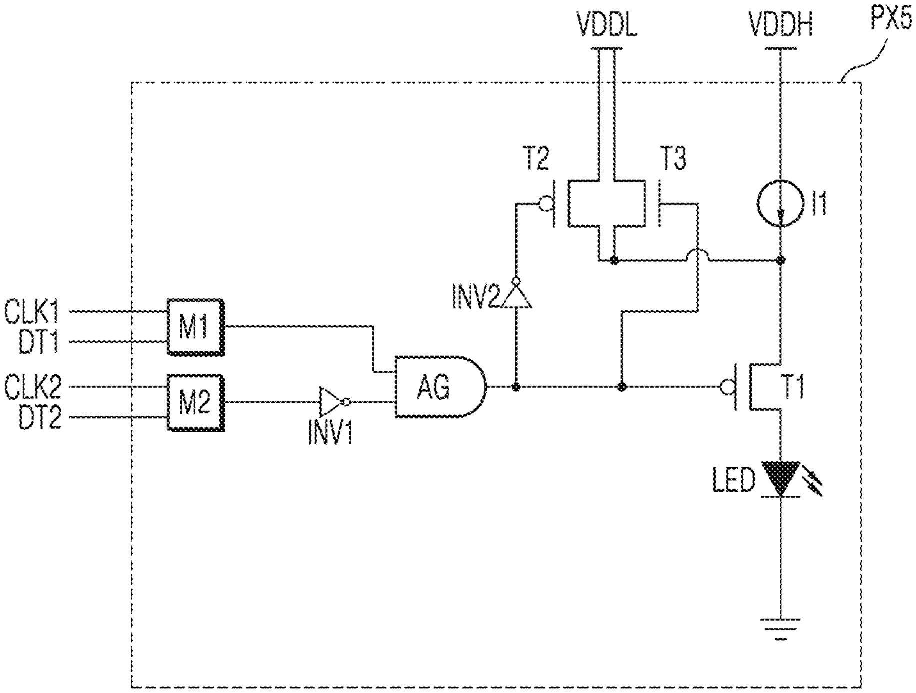
FIG. 13 is a diagram illustrating a pixel according to at least one example embodiment of the inventive concepts.

FIG. 13 is a circuit diagram illustrating a pixel PX5 according to at least one example embodiment of the inventive concepts. FIG. 13 illustrates an example of the pixel PX of FIG. 1, but the example embodiments are not limited thereto. FIG. 13 shows another example embodiment of the pixel PX3 of FIG. 10, and a repeated description thereof is omitted, but the example embodiments are not limited thereto.

Referring to FIG. 13, according to at least one example embodiment, the pixel PX5 may include a first storage element M1, a second storage element M2, first and second inverters INV1 and INV2, an AND gate AG, and/or first to third transistors T1 to T3, etc., but the example embodiments are not limited thereto.

The first storage element M1 may receive a first clock signal CLK1 and first data DT1, but is not limited thereto. The second storage element M2 may receive a second clock signal CLK2 and second data DT2, but is not limited thereto. An output from the second storage element M2 may be input to the first inverter INV1, etc.

The AND gate AG may receive an output from the first storage element M1 and an output from the first inverter INV1. An output from the AND gate AG may be transmitted to a gate of the first transistor T1, the second inverter INV2, and/or a gate of the third transistor T3, but is not limited thereto. An output signal from the second inverter INV2 may be transmitted to a gate of the second transistor T2, etc.

One end of the first transistor T1 may be connected to the current source I1 having a high level, and the other end thereof may be connected to the light emitting device LED, etc. One end of the second transistor T2 and one end of the third transistor T3 may be connected to the current source I1, and a low level voltage may be applied from the other end thereof.

According to at least one example embodiment, by using the first and second storage elements M1 and M2, a time for a clock signal to transition from a low level to a high level may be maintained longer. Accordingly, because a time for writing data increases, device characteristics may be improved, etc.

Figure 14:
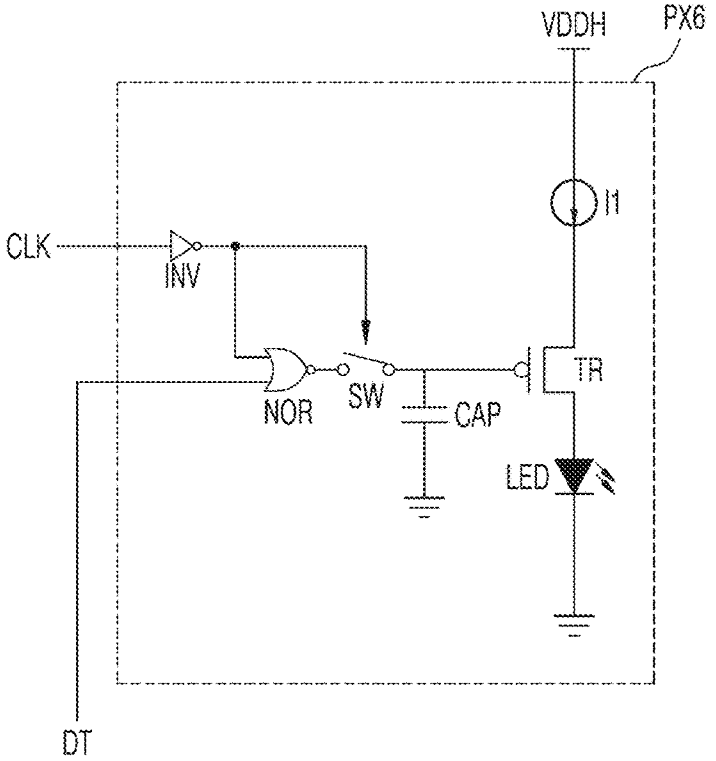
FIG. 14 is a diagram illustrating a pixel according to at least one example embodiment of the inventive concepts.

FIG. 14 is a circuit diagram illustrating a pixel PX6 according to at least one example embodiment of the inventive concepts. FIG. 14 illustrates an example of the pixel PX of FIG. 1, but the example embodiments are not limited thereto.

Referring to FIG. 14, according to at least one example embodiment, the pixel PX6 may include an inverter INV, a NOR gate NOR, a switch SW, a capacitor CAP, and/or a transistor TR, etc., but the example embodiments are not limited thereto.

The inverter INV may receive a clock CLK1 as an input. An output of the inverter INV may be transmitted to the NOR gate NOR and the switch SW, etc.

The NOR gate NOR may receive data DT and the output from the inverter INV and accumulate charges in the capacitor CAP, etc. Because the NOR gate NOR outputs a high-level signal (e.g., value="1") when all of the inputs are low-level signals (e.g., value="0"), a high-level signal may be output when both the data DT and the outputs from the inverter INV are low-level signals, etc.

The switch SW may be between the NOR gate NOR and the capacitor CAP to cut off or connect an electrical connection of the NOR gate NOR to the capacitor CAP, etc. According to some example embodiments, the switch SW is controlled by the output of the inverter INV, etc., but the example embodiments are not limited thereto.

The capacitor CAP may store charges according to and/or based on an output from the NOR gate NOR. The capacitor CAP may supply a signal to the transistor TR using previously accumulated charges even when an electrical connection to the NOR gate NOR is cut off by the switch SW, etc.

The transistor TR may be an N-type transistor or a P-type transistor. In at least one example embodiment, the transistor TR may be a P-type transistor, but is not limited thereto. Accordingly, the transistor TR may be turned on when a low-level signal is input to a gate of the transistor TR, etc. Accordingly, when the transistor TR is turned on, the light emitting device LED may emit light, and when the transistor TR is turned off, the light emitting device LED does not emit light.

According to at least one example embodiment, by forming the pixel PX6 including the capacitor CAP, an area of the pixel PX6 may be reduced.

Figure 15:
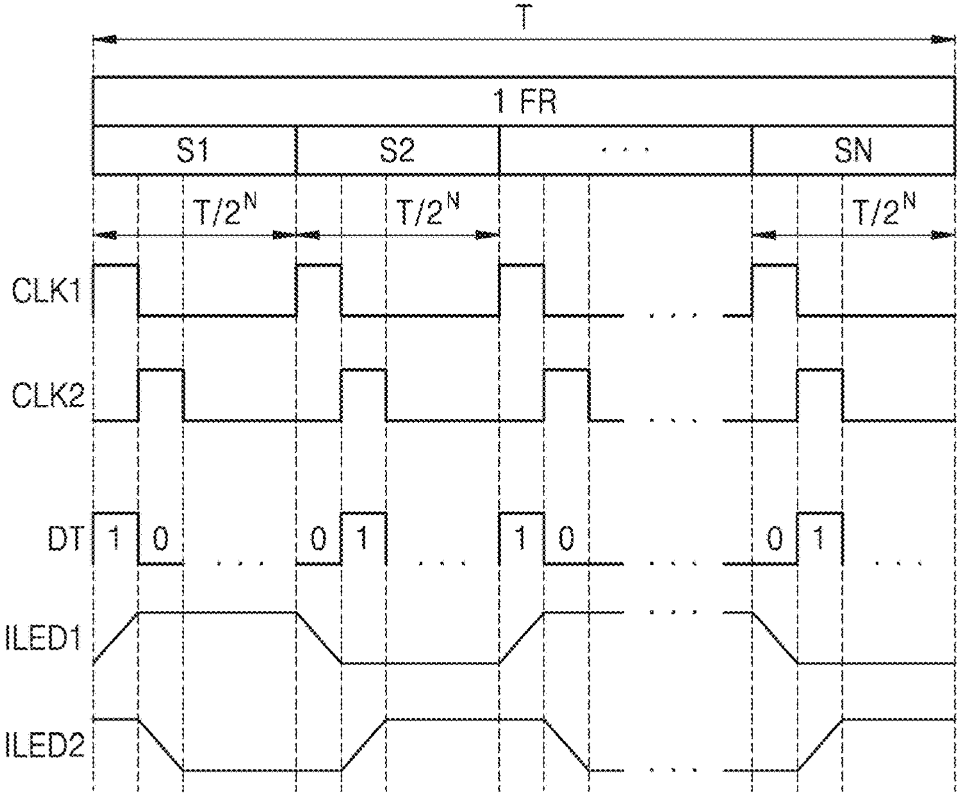
FIG. 15 is a timing diagram illustrating an operation according to at least one example embodiment of the inventive concepts.

FIG. 15 is a timing diagram illustrating an operation of a pixel according to at least one example embodiment of the inventive concepts. FIG. 15 illustrates an operation of a pixel array including the pixel PX6 of FIG. 14, however the example embodiments are not limited thereto.

Referring to FIG. 15, according to at least one example embodiment, a single frame may include a plurality of subframes S1 to Sn, etc., but the example embodiments are not limited thereto. The number of subframes S1 to Sn may be $2^n$, and n may be greater than or equal to 1 and may be an integer less than or equal to the number N of bit values to be expressed, but is not limited thereto. For example, when the number of bit values to be expressed is 8 (N=8), the number of subframes may be $2^8$, etc.

The duration of periods during which the subframes S1 to Sn are displayed and/or performed may be the same, but are not limited thereto. A period in which each of the subframes S1 to Sn is displayed and/or performed may be a period $T/2^n$ obtained by dividing the period T in which one frame is performed by the number $2^n$ of the subframes, etc.

Pixels arranged in the first row in a first column of the pixel array may receive a first clock CLK1 as a control signal, and a first driving current ILED1 may flow through the light emitting device, but the example embodiments are not limited thereto. Pixels arranged in a second row in the first column of the pixel array may receive a second clock CLK2 as a control signal, and a second driving current ILED2 may flow through the light emitting device, but are not limited thereto.

The first clock CLK1 may be toggled during each of the subframes S1 to Sn, but is not limited thereto. The second clock CLK2 may be toggled during each of the subframes S1 to Sn, but is not limited thereto. The first clock CLK1 and the second clock CLK2 may be sequentially input to the pixels connected thereto, but are not limited thereto. For example, immediately after the first clock CLK1 is input to the pixels arranged in the first row of the first column, the second clock CLK2 may be input to the pixels arranged in the second row of the first column, etc. In this manner, the control signal may be input up to the pixels arranged in an n-th row of the first column, etc.

The data DT may be input by row units. In at least one example embodiment, the data DT input to the subframes S1 to Sn may include the data input to the pixels arranged in the first row of the first column and the data input to the pixels arranged in the second row of the first column sequentially, but the example embodiments are not limited thereto. For example, in the first subframe S1, the data DT may be a signal for inputting 1 to pixels arranged in the first row of the first column and inputting 0 to the pixels arranged in the second row of the first column, etc.

The plurality of pixels PX6 may selectively cut off the driving currents ILED1 and/or ILED2 flowing through the light emitting device by combining the control signals CLK1 and CLK2 with the data DT, etc. For example, because the value of the first clock CLK1 input and the data DT input is '1' in the first subframe S1 of the pixels arranged in the first row of the first column, the first driving current ILED1 may flow through the light emitting device while the first subframe S1 is performed and/or displayed, etc. Subsequently, because the value of the first clock CLK1 input and data DT input is '0' during the second frame S2, the first driving current ILED1 may be cut off in the light emitting device while the second subframe S2 is performed and/or displayed, etc.

In the pixels arranged in the second row of the first column, the value of the first clock CLK1 input and data DT input is '0' during the first subframe S1 and the second clock CLK2 is toggled after the first clock CLK1 is toggled, therefore, after the first driving current ILED1 flows, the second driving current ILED2 may be cut off, etc., but the example embodiments are not limited thereto.

Figure 16:
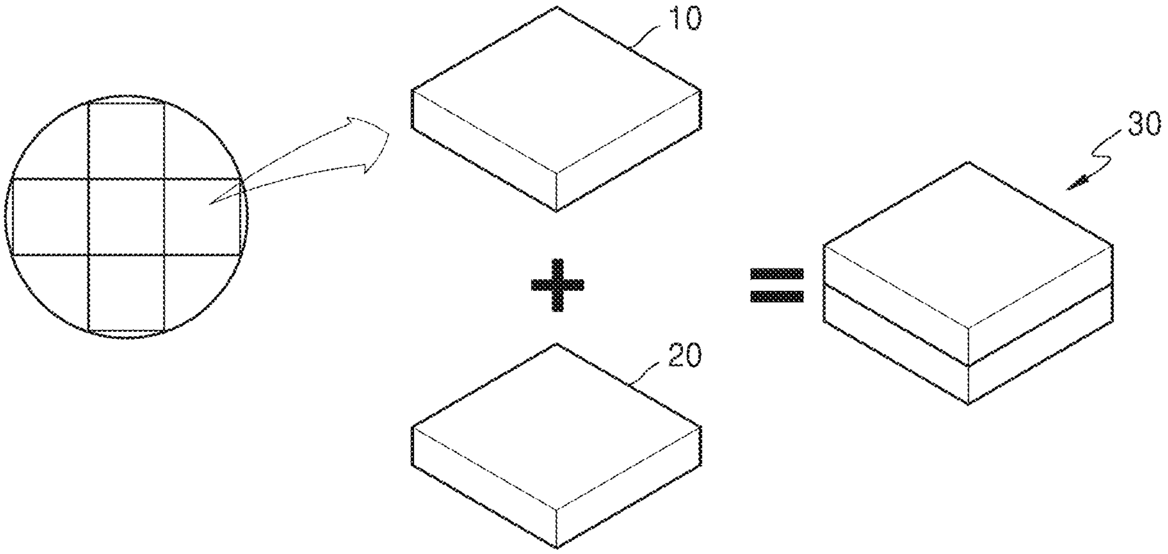
FIG. 16 is a diagram schematically illustrating a manufacturing process of a display device according to at least one example embodiment of the inventive concepts.

FIG. 16 is a diagram schematically illustrating a process of manufacturing a display device 30 according to at least one example embodiment of the inventive concepts.

Referring to FIG. 16, the display device 30 according to at least one example embodiment may include a light emitting device array 10 and/or a driving circuit board 20, etc., but is not limited thereto. The light emitting device array 10 may be coupled to the driving circuit board 20, etc.

The light emitting device array 10 may include a plurality of light emitting devices. The light emitting device may be an LED, but is not limited thereto. The light emitting device may be an LED having a micro to nano unit scale, etc. At least one light emitting device array 10 may be manufactured by growing a plurality of LEDs on a semiconductor wafer, but the example embodiments are not limited thereto. Accordingly, the display device 30 may be manufactured by combining the light emitting device array 10 with the driving circuit board 20 without having to individually transfer the LEDs to the driving circuit board 20, etc.

Pixel circuits respectively corresponding to the LEDs on the light emitting device array 10 may be arranged on the driving circuit board 20. The LEDs on the light emitting device array 10 may be electrically connected to the pixel circuits on the driving circuit board 20 to form the pixels PX, etc.

While the inventive concepts has been particularly shown and described with reference to various example embodiments thereof, it will be understood that various changes in form and details may be made therein without departing from the spirit and scope of the following claims.

What is claimed is:

1. A device comprising:
a pixel array including a plurality of rows, and each row of the plurality of rows includes a plurality of pixels;
a row driver configured to,
generate a plurality of control signals,
drive the plurality of rows of the pixel array using the plurality of control signals, and
generate a plurality of clock signals;
a row multiplexer configured to receive the plurality of clock signals, and selectively transmit one clock signal of the plurality of clock signals to the pixel array;
a data driver configured to transmit a plurality of data signals to the pixel array by column units; and
each pixel of the plurality of pixels includes,
a light emitting device,
a shift register configured to receive the selectively transmitted clock signal from the row multiplexer, and generate a width adjusted pulse width modulation (PWM) signal based on a desired brightness level of the light emitting device, and
a transistor configured to transmit a driving current to the light emitting device based on the PWM signal.

2. The device of claim 1, wherein
the row driver is further configured to,
generate a data clock signal and a PWM clock signal, the data clock signal and the PWM clock signal included in the plurality of clock signals; and
the shift register is further configured to,
store the plurality of data signals during a data write period based on the data clock signal, and
output the PWM signal from during a light emission period based on a width adjustment of the PWM clock signal.

3. The device of claim 1, wherein the plurality of pixels included in each row of the plurality of rows are configured to share a common row multiplexer.

4. The device of claim 1, wherein
the row driver is configured to drive the plurality of rows during a frame period, the frame period including a data write period and a light emission period; and
the shift register includes a plurality of flip-flops, wherein each of the plurality of flip-flops is numbered 1 to N, where N is an integer greater than 1.

5. The device of claim 4, wherein
the light emission period includes a plurality of subframe periods, each subframe period of the plurality of subframe periods having different durations; and
the row driver is further configured to toggle a PWM clock signal every subframe period based on a desired light emission time of the light emitting device.

6. The device of claim 5, wherein
a number of subframe periods of the plurality of subframe periods is the same as a number of the flip-flops included in the shift register;
a duration for each subframe period of the plurality of subframe is equal to a duration of the light emission period divided by 2; and
n is incremented by 1 from 1 to N.

7. The device of claim 4, wherein each pixel of the plurality of pixels further includes:
a write multiplexer configured to select a data signal of the plurality of data signals or a bit value stored in a desired flip-flop of the plurality of flip-flops, and output the selected data signal or the bit value to the shift register, wherein the desired flip-flop configured to store the PWM signal.

8. The device of claim 1, wherein
each pixel of the plurality of pixels is further configured to be driven during a frame period, the frame period including a data write period and a light emission period; and
the shift register includes a plurality of latches, wherein each of the plurality of latches is numbered 1 to N.

9. The device of claim 8, wherein
the row multiplexer includes a plurality of multiplexers corresponding to the plurality of latches; and
the plurality of multiplexers are configured to select one clock signal of the plurality of clock signals, and transmit the selected clock signal to the plurality of latches corresponding thereto.

10. The device of claim 8, wherein
the shift register further includes a feedback latch, the feedback latch configured to store a bit value stored in a desired latch of the plurality of latches, the desired latch configured to output the PWM signal; and
each pixel of the plurality of pixels further includes a write multiplexer, the write multiplexer configured to select a data signal of the plurality of data signals or the bit value stored in the feedback latch, and output the selected data or the bit value to the shift register.

11. The device of claim 8, wherein
the light emission period includes a plurality of subframe periods, each subframe period having different durations; and
the row driver is further configured to serially toggle a PWM clock signal every subframe period of the plurality of subframe period, and control a light emission time of the light emitting device based on the PWM clock signal.

12. The device of claim 11, wherein
the row driver is further configured to toggle a feedback PWM clock signal every subframe period of the plurality of subframe periods, and toggle the feedback PWM clock signal before serially toggling the PWM clock signal.

13. The device of claim 1, wherein the shift register is configured to store a plurality of bit values.

14. A device comprising:
a pixel array including a plurality of pixels, the plurality of pixels arranged in a plurality of rows and a plurality of columns, each pixel of the plurality of pixels including a light emitting device and a storage element;
a row driver configured to generate a plurality of control signals and a plurality of clock signals, and drive the pixel array by row using the plurality of controls signals and the plurality of clock signals including a first clock signal,
the row driver further configured to adjust a width of the first clock signal to control brightness of at least one light emitting device of the plurality of light emitting devices, and
the row driver is further configured to drive each pixel of the plurality of pixels during a frame period, the frame period including a plurality of subframe periods, and toggle the first clock signal once every subframe period of the plurality of subframe periods; and a data driver configured to output a plurality of data signals to the pixel array by column.

15. The device of claim 14, wherein each subframe period of the plurality of subframe periods has a duration equal to a period of the frame divided by $2^n$, where n is an integer incremented by 1 for each subframe period.

16. The device of claim 14, wherein the storage element is any one of a latch, a flip-flop, or a static random access memory (SRAM) configured to store a bit value; and each pixel of the plurality of pixels includes, a level shifter configured to receive at least one signal output by the storage element, and convert the received at least one signal into a corresponding voltage level, and a first transistor configured to control turn ON or turn OFF the light emitting device of the pixel based on an output from the level shifter.

17. The device of claim 16, wherein the at least one signal output from the storage element includes a first signal and a second signal, the second signal complementary to the first signal; and the level shifter includes, an N-type transistor configured to receive the first signal; and a P-type transistor configured to receive the second signal, and the N-type transistor and the P-type transistor are each configured to receive a low level source voltage at a first end, respectively, and receive a high level source voltage at a second end, respectively.

18. The device of claim 14, wherein the storage element includes:

a shift register configured to, receive a selected clock signal among the plurality of clock signals, and generate a pulse width modulation (PWM) signal, and adjust a width of the PWM signal based on a desired brightness of the light emitting device.

19. A pixel comprising:

a light emitting device;

a NOR gate configured to receive a clock signal for controlling the light emitting device; and a capacitor configured to store an output from the NOR gate; and a switch configured to selectively cut off an electrical connection of the NOR gate to the capacitor based on the clock signal.

20. The device of claim 19, wherein the clock signal is toggled repeatedly at desired time intervals.

* * * * *